United States Patent
Zou

(10) Patent No.: US 12,519,166 B1
(45) Date of Patent: Jan. 6, 2026

(54) TOOL BATTERY PACK

(71) Applicant: Lawnix Technology (Nanjing) Co., Ltd., Jiangsu (CN)

(72) Inventor: Xiaoke Zou, Jiangsu (CN)

(73) Assignee: Lawnix Technology (Nanjing) Co., Ltd., Nanjing (CN)

( * ) Notice: Subject to any disclaimer, the term of this patent is extended or adjusted under 35 U.S.C. 154(b) by 0 days.

(21) Appl. No.: 19/256,208

(22) Filed: Jul. 1, 2025

(30) Foreign Application Priority Data

Feb. 28, 2025 (CN) .......................... 202520348339.4
Mar. 27, 2025 (CN) .......................... 202520561968.5

(51) Int. Cl.
| | | |
|---|---|---|
| *H01M 50/247* | (2021.01) | |
| *H01M 10/653* | (2014.01) | |
| *H01M 50/224* | (2021.01) | |
| *H01M 50/24* | (2021.01) | |
| *H01M 50/367* | (2021.01) | |

(52) U.S. Cl.
CPC ....... *H01M 50/247* (2021.01); *H01M 10/653* (2015.04); *H01M 50/224* (2021.01); *H01M 50/24* (2021.01); *H01M 50/367* (2021.01)

(58) Field of Classification Search
None
See application file for complete search history.

(56) References Cited

U.S. PATENT DOCUMENTS

2008/0182158 A1 * 7/2008 Houchin-Miller ........................... H01M 50/591
429/179
2024/0120593 A1   4/2024 Zhang et al.

FOREIGN PATENT DOCUMENTS

| CN | 215834607 U | 2/2022 |
|---|---|---|
| CN | 115708249 A | 2/2023 |
| CN | 219696510 U | 9/2023 |
| CN | 219739093 U | 9/2023 |
| CN | 117855719 A | 4/2024 |
| CN | 118281474 A | 7/2024 |

OTHER PUBLICATIONS

MSDS of Polypropylene retrieved from https://www.acplasticsinc.com/techsheets/Polypropylene_MSDS.pdf printed Oct. 22, 2025 (Year: 2025).*

* cited by examiner

*Primary Examiner* — Maria Laios
(74) *Attorney, Agent, or Firm* — IPro, PLLC

(57) ABSTRACT

Embodiments of the present application relate to the technical field of energy. A tool battery pack is provided. The tool battery pack includes: a housing assembly and a thermally conductive barrier, where the barrier is arranged at a battery cell end face, the battery cell end face is configured as a reference plane, and the barrier has a first end face closer to the reference plane and a second end face away from the reference plane, where a distance G1 exists between the first end face and the battery cell end face, forming a pressure relief space therebetween, and the pressure relief space includes at least one pressure relief outlet.

20 Claims, 30 Drawing Sheets

TOOL BATTERY PACK

CROSS-REFERENCE TO RELATED APPLICATIONS

The present application claims priority to Chinese Patent Application No. 202520348339.4 filed with the China National Intellectual Property Administration on Feb. 28, 2025 and entitled "BATTERY PACK", and Chinese Patent Application No. 202520561968.5 filed with the China National Intellectual Property Administration on Mar. 27, 2025 and entitled "TOOL BATTERY PACK", which are incorporated herein by reference in their entirety.

TECHNICAL FIELD

Embodiments of the present application relate to the technical field of energy, and in particular, to a tool battery pack.

BACKGROUND

Tool battery packs in the conventional technology are typically composed of 1-parallel or 2-parallel battery cell assemblies. Since the tools have relatively low power and charging/discharging requirements, resulting in a very low probability of thermal runaway in battery packs, no barrier is provided. However, as tool power continues to increase, higher demands are placed on battery pack capacity and charging/discharging rates. The higher charging/discharging rates lead to larger local temperature gradients, significantly raising the risk of thermal runaway, which, if not addressed, can result in battery pack and tool damage, as well as user safety hazards. In the power battery field, in order to mitigate thermal runaway in battery cells, heat-resistant materials such as mica sheets and aerogel plates are commonly used to block battery cell end faces. These materials can effectively isolate high-temperature and high-pressure gases and liquids ejected from battery cells, preventing secondary damage to the surrounding environment and other battery cells. Nevertheless, these conventional barrier methods still have certain shortcomings and limitations. While these materials excel in thermal insulation, the high-temperature gases released during thermal runaway cannot be quickly vented. This situation may lead to a continuous rise in internal temperature, hindering rapid heat dissipation and triggering a temperature surge in adjacent cells. Moreover, if the accumulated heat is not dissipated in time, it may conduct through battery cell housings or connecting members, causing failures in other areas and increasing the risk of overall thermal runaway in the battery packs.

SUMMARY

The present application aims to provide a tool battery pack that solves problems such as high-temperature gas retention and secondary thermal runaway triggering in the tool battery pack, thereby achieving a lightweight, efficient, and safely insulated solution.

An embodiment of a tool battery pack is provided according to the present application. The tool battery pack includes: a housing assembly, where the housing assembly is configured to accommodate a unit battery cell, and the unit battery cell includes a battery cell end face and a battery cell body, where the tool battery pack further includes a thermally conductive barrier, where the barrier is arranged at the battery cell end face, the battery cell end face is configured as a reference plane, and the barrier has a first end face closer to the reference plane and a second end face away from the reference plane, where a distance $G1$ exists between the first end face and the battery cell end face, forming a pressure relief space therebetween, and the pressure relief space includes at least one pressure relief outlet. Existing tool battery packs in the conventional technology lack barriers, resulting in that end faces of unit battery cells undergoing thermal runaway eject high-temperature gases and flames toward housing assemblies and/or adjacent battery cell assemblies due to failure in thermal diffusion, subsequently causing damage or destruction; in contrast, in the present application, the pressure relief space formed between the barrier and the battery cell end face, combined with the pressure relief outlet, establishes a directional pressure relief mechanism, which can direct high-temperature gases and flames caused by thermal runaway toward a predefined safe area, effectively mitigating internal pressure buildup risks while providing a dual effect of protection and isolation. Moreover, the thermally conductive barrier not only acts as a physical shield against direct flame impingement on the housing and/or adjacent battery cell assemblies but also rapidly dissipates local heat across the entire battery pack's heat dissipation system by virtue of its thermal conduction characteristics, enabling flame quenching in gaps due to metal surface cooling effects and containment of solid molten debris within the pressure relief space, thereby preventing ejection toward the adjacent battery cells. As a result, the entire battery pack can significantly reduce fire or explosion risks during thermal runaway of a unit battery cell and improve overall reliability and safety.

In an embodiment, the distance $G1$ is greater than or equal to 1 mm and less than 10 mm. By precisely controlling the distance $G1$, it can effectively block initial thermal surges while directing them toward the designated pressure relief space. This design can effectively limit thermal propagation effects from the unit battery cell undergoing thermal runaway to adjacent unit battery cells and/or the housing assembly 1 in front, rear, left, and right directions, thereby delaying or preventing thermal runaway propagation from the unit battery cell throughout the entire tool battery pack to a certain extent; moreover, it maintains a compact size of the entire tool battery pack, ensuring compatibility with existing tools and devices without compromising safety or performance. The standardized distance also simplifies and streamlines production and assembly processes, enhancing operational efficiency.

In an embodiment, the barrier is made of a rigid material with an ignition point higher than or equal to 300° C.; or the barrier is made of a metal material, and the distance $G1$ is greater than or equal to 1 mm and less than 10 mm. The rigid material with an ignition point higher than or equal to 300° C. ensures structural integrity of the barrier in high-temperature environments or during thermal runaway of a unit battery cell, resisting combustion or decomposition to enhance battery system safety; in addition, the rigid material provides superior thermal resistance, effectively blocking flame propagation and thermal conduction to adjacent battery cells, thereby reducing thermal runaway propagation risks. Under extreme conditions, the rigid material can serve as a fireproof barrier, protecting internal battery cells from external heat sources or thermal effects generated by other battery cells.

The metal barrier forms a non-contact thermal conduction channel with the battery cell end face through the distance $G1$, enabling rapid lateral dissipation of local heat to a heat dissipation surface of the housing during thermal runaway.

Within the distance G1, the metal barrier creates an elastic buffer layer that absorbs impact energy through metal deformation when a sudden pressure spike occurs during battery cell eruption and develops a robust dynamic impact resistance capability in conjunction with pressure attenuation within the distance.

In an embodiment, a thickness J of a part of the barrier corresponding to the battery cell end face is greater than or equal to 0.8 mm and less than or equal to 3 mm. When the thickness J of the part of the barrier is within a range of 0.8 mm to 3 mm, sufficient space can be provided for pressure relief while maintaining structural strength. This thickness design effectively guides and releases pressure under extreme conditions (such as thermal runaway) while maintaining a sufficient thermal isolation capability to slow thermal conduction between adjacent battery cells, thereby enhancing battery system safety; in addition, it can ensure the barrier provides structural support and isolation without adding excessive weight or occupying excessive space, preserving the overall lightweight and compactness of the tool battery pack.

In an embodiment, the number of the unit battery cell is at least two, and the battery cell end face includes a first battery cell end face and a second battery cell end face corresponding to the at least two unit battery cells, where a difference between a thickness of a part of the barrier corresponding to the first battery cell end face and a thickness of a part of the barrier corresponding to the second battery cell end face is less than or equal to 1 mm. By controlling the difference between the thicknesses of the parts of the barrier corresponding to the first and second battery cell end faces, since the thicker barrier in high-frequency thermal runaway areas contains more materials and has a higher local heat capacity, it can absorb greater thermal energy and delay temperature rise rates, and its thermal conduction pathway can rapidly direct heat to the heat dissipation structure of the housing, preventing heat accumulation; conversely, the thinner barrier in low-frequency thermal runaway areas prioritizes heat dissipation efficiency, preventing abnormal local temperature spikes through rapid thermal conduction, thereby achieving differentiated pressure relief space responses.

In an embodiment, the thickness of the part of the barrier corresponding to the first battery cell end face is equal to the thickness of the part of the barrier corresponding to the second battery cell end face, thereby facilitating production.

In an embodiment, the thickness of the part of the barrier corresponding to the first battery cell end face is greater than the thickness of the part of the barrier corresponding to the second battery cell end face. The first battery cell end face is a high-frequency thermal runaway area that ejects high-temperature and high-pressure gases, where the barrier is relatively thicker, creating a smaller pressure relief space to provide greater resistance to the initial high-pressure gas eruption during thermal runaway, thereby slowing down gas velocity and reducing direct impact on the pressure relief outlet; conversely, the second battery cell end face is a low-frequency thermal runaway area that also ejects high-temperature and high-pressure gases, where the barrier is relatively thinner, forming a larger pressure relief space to contain more gas expansion and buffer pressure fluctuations, thereby achieving differentiated pressure relief space responses.

In an embodiment, a part of the first end face of the barrier corresponding to the battery cell end face is provided with a convex structure away from the reference plane, and/or, in an embodiment, a part of the second end face of the barrier corresponding to the battery cell end face is provided with a convex structure away from the reference plane. The adoption of the convex structure can increase the distance between the battery cell assembly end face and the end face of the barrier, thereby expanding the width of the pressure relief space. As a result, the expanded pressure relief space can more effectively contain and mitigate gases or heat released by the battery cell during abnormal conditions, preventing safety hazards caused by excessive pressure buildup. Additionally, the convex structure provides greater surface area, which facilitates more efficient heat dissipation through natural convection. The battery cell will generate heat during charging/discharging; therefore, a well-designed heat dissipation structure can keep the battery cell within a safe operating temperature range and improve thermal management efficiency.

In an embodiment, parts of the first and second end faces of the barrier corresponding to the battery cell end face are flat.

An embodiment of a tool battery pack is provided according to the present application. The tool battery pack includes: a housing assembly, and a battery cell assembly, where the housing assembly is configured to accommodate the battery cell assembly, the battery cell assembly includes a first battery cell assembly including a first battery cell assembly end face and a second battery cell assembly end face, a second battery cell assembly including a third battery cell assembly end face and a fourth battery cell assembly end face, and a battery cell assembly connecting member configured for connecting the first battery cell assembly to the second battery cell assembly, where the first battery cell assembly and the second battery cell assembly each is configured to accommodate a unit battery cell, and the third battery cell assembly end face and the second battery cell assembly end face are oppositely arranged. The tool battery pack further includes a barrier, where the barrier is arranged between the third battery cell assembly end face and the second battery cell assembly end face via a positioning connector, the third battery cell assembly end face is configured as a reference plane, and the barrier has a first end face closer to the reference plane and a second end face away from the reference plane, where a distance G1 exists between the first end face and the third battery cell assembly end face, forming a first pressure relief space therebetween, while a distance G2 exists between the second end face and the second battery cell assembly end face, forming a second pressure relief space therebetween, where the first pressure relief space and the second pressure relief space include at least one pressure relief outlet. Existing tool battery packs in the conventional technology lack barriers, resulting in that end faces of unit battery cells undergoing thermal runaway eject high-temperature gases and flames toward the housing assembly and/or the battery cell assembly due to failure in thermal diffusion, subsequently causing damage or destruction; in contrast, in the present application, the barrier arranged between the third battery cell assembly end face and the second battery cell assembly end face introduces a relatively independent pressure relief space between adjacent battery cell assemblies, thereby creating a physical shield. The pressure relief space formed between the barrier and the battery cell assembly end face, combined with the pressure relief outlet, establishes a directional pressure relief mechanism, which can direct high-temperature gases and flames caused by thermal runaway toward a predefined safe area, effectively mitigating internal pressure buildup risks. As a result, the entire battery pack can significantly reduce fire or explosion risks during thermal runaway of a unit battery cell and improve overall reliability and safety.

In an embodiment, the distance G1 is greater than or equal to 1 mm and less than 10 mm, and/or, the distance G2 is greater than or equal to 1 mm and less than 10 mm. By precisely controlling the distances (G1 and G2), it can effectively block initial thermal surges while directing them toward the designated pressure relief space. This design can effectively limit thermal propagation effects from the unit battery cell undergoing thermal runaway to adjacent unit battery cells in front, rear, left, and right directions, thereby delaying or preventing thermal runaway propagation from the unit battery cell throughout the entire tool battery pack to a certain extent; moreover, it maintains a compact size of the entire tool battery pack, ensuring compatibility with existing tools and devices without compromising safety or performance. The standardized distances also simplify and streamline production and assembly processes, enhancing operational efficiency.

In an embodiment, a difference between the distances G1 and G2 is less than or equal to 3 mm. The difference creates asymmetric thermal conduction pathways, enabling differentiated thermal propagation management within the spaces. By increasing the distances in high-risk areas such as positive battery cell end faces while decreasing the distances in low-risk areas such as negative battery cell end faces, the design achieves more flexible and efficient thermal management; moreover, through meticulous space management, the design enhances the tool battery pack's safety performance during thermal runaway while maintaining its structural compactness and applicability, thereby enhancing the practical effectiveness of the tool battery pack in real applications.

In an embodiment, the distance G1 is equal to the distance G2. In this case, the symmetrical distances G1/G2 enable high-temperature gases to be discharged in parallel from both the first and second pressure relief spaces at identical flow rates during the early stage of thermal runaway, preventing local airflow vortices caused by uneven pressure relief and thereby reducing thermal surge superposition risks. The equidistant dual-pressure-relief-space design establishes a bidirectional pressure relief compensation mechanism: when abnormal gas generation occurs on one side of the battery cell assembly, the symmetrical channels automatically balance a pressure difference formed between both sides to prevent structural deformation from unilateral overpressure while suppressing thermal runaway chain reactions. The balanced pressure relief channels distribute heat uniformly along the battery pack's axial direction, and when combined with the barrier's high-temperature resistance, significantly mitigate inter-battery-cell thermal stress concentration issues.

In an embodiment, the unit battery cell includes a battery cell end face and a battery cell body, and a thickness J of a part of the barrier corresponding to the battery cell end face is greater than or equal to 0.8 mm and less than or equal to 3 mm. When the thickness J of the part of the barrier is within a range of 0.8 mm to 3 mm, sufficient space can be provided for pressure relief while maintaining structural strength. This thickness design effectively guides and releases pressure under extreme conditions (such as thermal runaway) while maintaining a sufficient thermal isolation capability to slow thermal conduction between adjacent battery cells, thereby enhancing battery system safety; in addition, it can ensure the barrier provides structural support and isolation without adding excessive weight or occupying excessive space, preserving the overall lightweight and compactness of the tool battery pack.

In an embodiment, the battery cell end face includes a first battery cell end face and a second battery cell end face, and the battery cell assembly end face includes at least two battery cell end faces corresponding to at least two unit battery cells, where a difference between a thickness of a part of the barrier corresponding to the first battery cell end face and a thickness of a part of the barrier corresponding to the second battery cell end face is less than or equal to 1 mm. By controlling the difference between the thicknesses of the parts of the barrier corresponding to the first and second battery cell end faces, since the thicker barrier in high-frequency thermal runaway areas contains more materials and has a higher local heat capacity, it can absorb greater thermal energy and delay temperature rise rates, and its thermal conduction path rapidly directs heat to the heat dissipation structure of the housing, preventing heat accumulation; conversely, the thinner barrier in low-frequency thermal runaway areas prioritizes heat dissipation efficiency, preventing abnormal local temperature spikes through rapid thermal conduction, thereby achieving differentiated pressure relief space responses.

In an embodiment, the thickness of the part of the barrier corresponding to the first battery cell end face is equal to the thickness of the part of the barrier corresponding to the second battery cell end face; or the thickness of the part of the barrier corresponding to the first battery cell end face is greater than the thickness of the part of the barrier corresponding to the second battery cell end face, thereby facilitating production.

The first battery cell end face is a high-frequency thermal runaway area that ejects high-temperature and high-pressure gases, where the barrier is relatively thicker, creating a smaller pressure relief space to provide greater resistance to the initial high-pressure gas eruption during thermal runaway, thereby slowing down gas velocity and reducing direct impact on the pressure relief outlet; conversely, the second battery cell end face is a low-frequency thermal runaway area that also ejects high-temperature and high-pressure gases, where the barrier is relatively thinner, forming a larger pressure relief space to contain more gas expansion and buffer pressure fluctuations, thereby achieving differentiated pressure relief space responses.

In an embodiment, a part of the first end face of the barrier corresponding to the battery cell end face is provided with a convex structure away from the reference plane, and/or, in an embodiment, a part of the second end face of the barrier corresponding to the battery cell end face is provided with a convex structure away from the reference plane. The adoption of the convex structure can increase the distance between the battery cell assembly end face and the end face of the barrier, thereby expanding the width of the pressure relief space. As a result, the expanded pressure relief space can more effectively contain and mitigate gases or heat released by the battery cell during abnormal conditions, preventing safety hazards caused by excessive pressure buildup. Additionally, the convex structure provides greater surface area, which facilitates more efficient heat dissipation through natural convection. The battery cell will generate heat during charging/discharging; therefore, a well-designed heat dissipation structure can keep the battery cell within a safe operating temperature range and improve thermal management efficiency.

In an embodiment, parts of the first and second end faces of the barrier corresponding to the battery cell end face are flat.

In an embodiment, the barrier is made of a thermally conductive material with an ignition point higher than or equal to 300° C., providing a dual effect of protection and isolation. Moreover, the thermally conductive barrier not only acts as a physical shield against direct flame impingement on the housing and/or adjacent battery cells but also rapidly dissipates local heat across the entire battery pack's heat dissipation system by virtue of its thermal conduction characteristics, enabling flame quenching in gaps due to metal surface cooling effects and containment of solid molten debris within the pressure relief space, thereby preventing ejection toward the adjacent battery cells. As a result, the entire battery pack can significantly reduce fire or explosion risks during thermal runaway of a unit battery cell and improve overall reliability and safety.

In an embodiment, the barrier is made of a rigid material with an ignition point higher than or equal to 300° C. The rigid material with an ignition point higher than or equal to 300° C. ensures structural integrity of the barrier in high-temperature environments or during thermal runaway of a unit battery cell, resisting combustion or decomposition to enhance battery system safety; in addition, the rigid material provides superior thermal resistance, effectively blocking flame propagation and thermal conduction to adjacent battery cells, thereby reducing thermal runaway propagation risks. Under extreme conditions, the rigid material can serve as a fireproof barrier, protecting internal battery cells from external heat sources or thermal effects generated by other battery cells.

In an embodiment, the barrier is made of a metal material, and the metal barrier forms a non-contact thermal conduction channel with the battery cell end face through the distance G1, enabling rapid lateral dissipation of local heat to a heat dissipation surface of the housing during thermal runaway. Within the distance G1, the metal barrier creates an elastic buffer layer that absorbs impact energy through metal deformation when a sudden pressure spike occurs during battery cell eruption and develops a robust dynamic impact resistance capability in conjunction with pressure attenuation within the distance.

BRIEF DESCRIPTION OF THE DRAWINGS

One or more embodiments are exemplarily described with reference to the accompanying drawings, but these exemplary descriptions do not constitute limitations on the embodiments.

DETAILED DESCRIPTION

As can be seen from the background, tool battery packs in the conventional technology are typically composed of 1-parallel or 2-parallel battery cell assemblies. Since the tools have relatively low power and charging/discharging requirements, resulting in a very low probability of thermal runaway in battery packs, no barrier is provided. However, as tool power continues to increase, higher demands are placed on battery pack capacity and charging/discharging rates. The higher charging/discharging rates lead to larger local temperature gradients, significantly raising the risk of thermal runaway, which, if not addressed, can result in battery pack and tool damage, as well as user safety hazards. In the power battery field, in order to mitigate thermal runaway in battery cells, heat-resistant materials such as mica sheets and aerogel plates are commonly used to block battery cell end faces. These materials can effectively isolate high-temperature and high-pressure gases and liquids ejected from battery cells, preventing secondary damage to the surrounding environment and other battery cells. Nevertheless, these conventional barrier methods still have certain shortcomings and limitations. While these materials excel in thermal insulation, the high-temperature gases released during thermal runaway cannot be quickly vented. This situation may lead to a continuous rise in internal temperature, hindering rapid heat dissipation and triggering a temperature surge in adjacent cells. Moreover, if the accumulated heat is not dissipated in time, it may conduct through battery cell housings or connecting members, causing failures in other areas and increasing the risk of overall thermal runaway in the battery packs.

Figure 12:
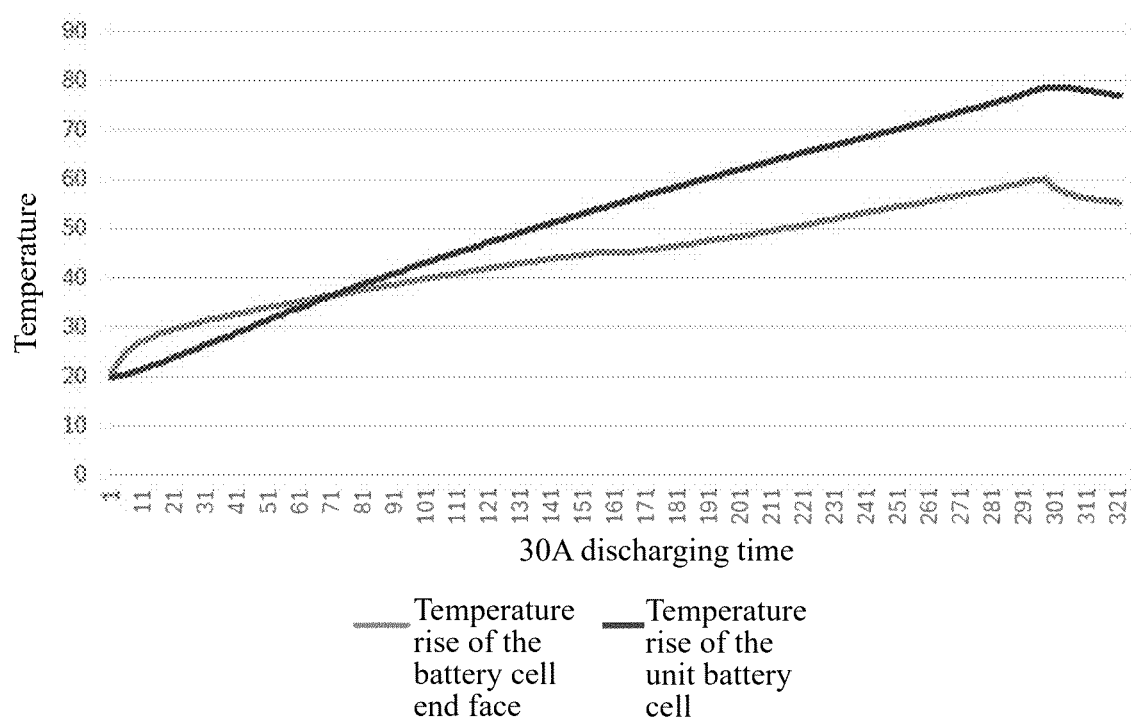
FIG. 12 is a temperature variation data graph of a 60V battery cell and a battery cell end face under a 30A discharging mode of a tool battery pack provided in an embodiment of the present application.
Figure 13:
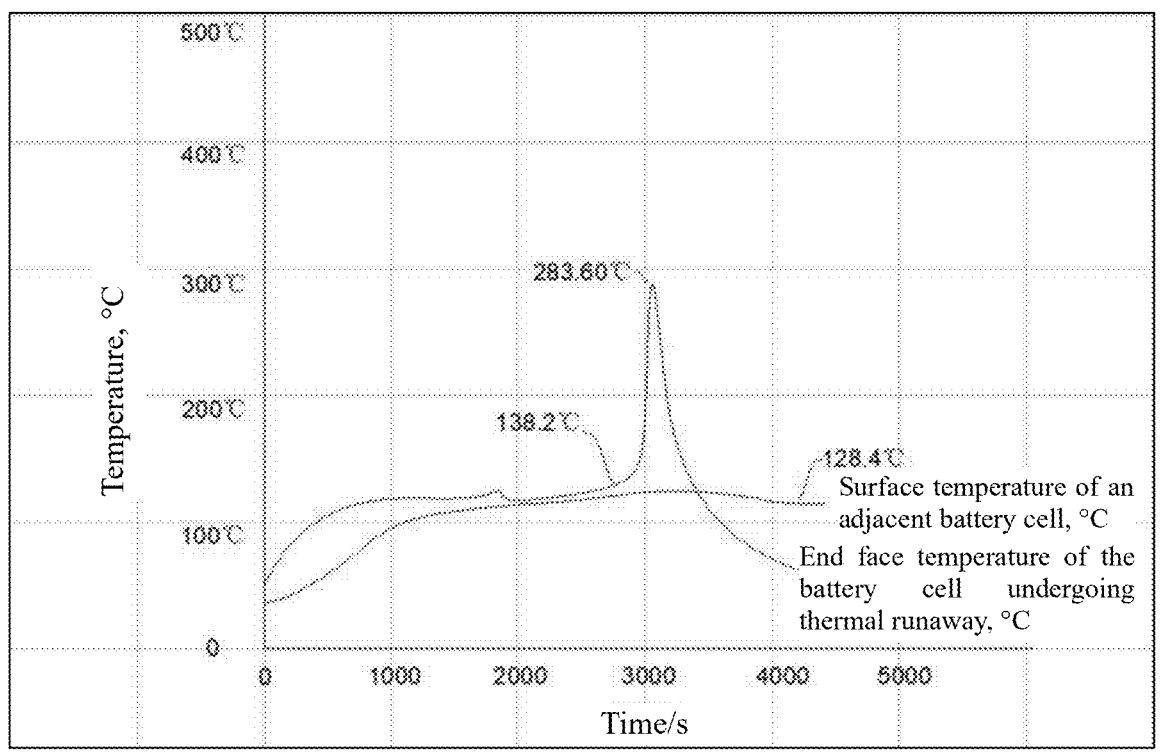
FIG. 13 is a temperature variation data graph of a unit battery cell undergoing thermal runaway and an adjacent battery cell of a tool battery pack provided in an embodiment of the present application.

As shown in FIGS. 12 and 13, during 30A discharging of a 60V unit battery cell 23, the temperature rise of the battery cell end face reaches about 60° C. As current intensity increases, the temperature rise of the battery cell end face also escalates. During charging/discharging, if the temperature of the battery cell end face continues rising and reaches 100° C., the surface temperature of an adjacent battery cell will progressively rise following the temperature rise of the battery cell undergoing thermal runaway. When the battery cell undergoing thermal runaway reaches 283.6° C., it will experience irreversible overheating, with its end face temperature rising sharply, which often causes high-pressure and high-temperature jet fires at the first battery cell end face 211. If the battery cell undergoing thermal runaway is not contained, the surface temperature of the adjacent battery cell will be affected by thermal propagation therefrom, causing them to also undergo thermal runaway. This situation can be spread throughout the entire battery pack.

Through research on the internal temperature characteristics of battery cells undergoing overheating/thermal runaway in existing tool battery packs and on the thermal transfer characteristics of the entire battery packs, the aforementioned drawbacks are recognized and their root causes are analyzed. By ingeniously implementing a barrier, optimizing structural design, and selecting suitable materials, the present application solves problems in tool battery packs such as bulky structure, high-temperature gas retention, and secondary thermal runaway triggering.

To make the objectives, technical solutions, and advantages of the embodiments of the present application clearer, the embodiments of the present application will be described in detail with reference to the accompanying drawings. However, it may be understood by those of ordinary skill in the art that in the embodiments of the present application, many technical details are proposed for readers to better understand the present application. Even without these technical details and various changes and modifications based on the following embodiments, the technical solutions claimed to be protected by the present application may also be implemented. The following embodiments are divided for ease of description, and shall not be construed as any limitation on the implementation manners of the present application. The embodiments may be combined with each other and cross-referenced on the premise of no contradiction.

FIGS. 1-13 are schematic structural diagrams of a tool battery pack provided in an embodiment of the present application.

An Embodiment of a Tool Battery Pack

Figure 1:
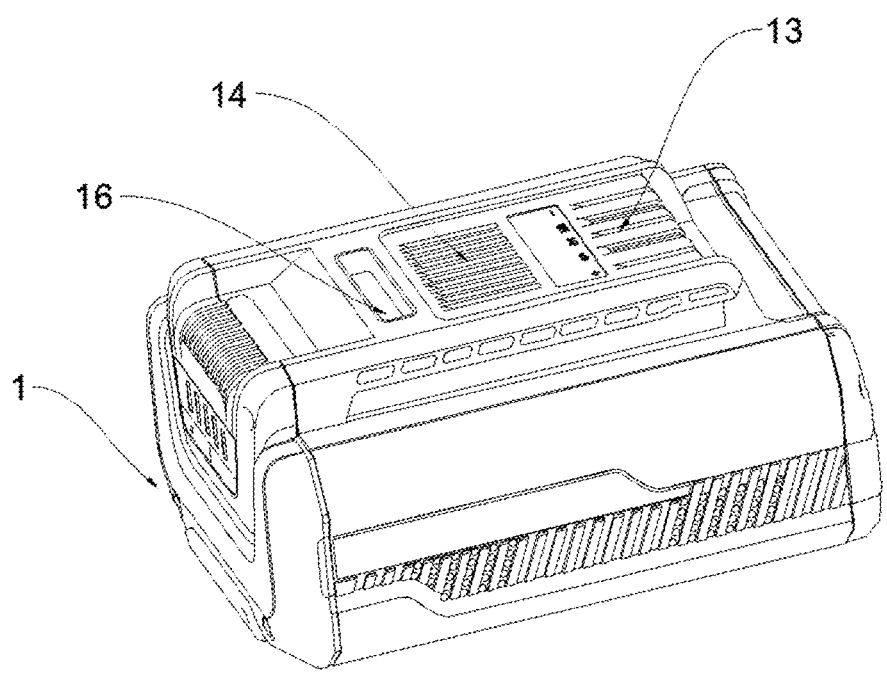
FIG. 1 is a top-down perspective view of a tool battery pack provided in an embodiment of the present application.
Figure 2:
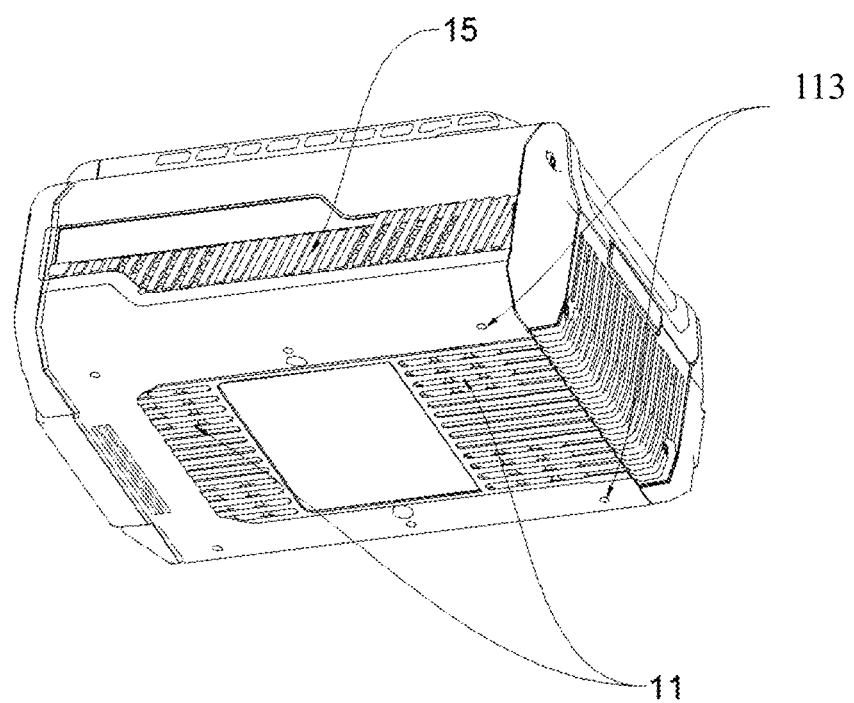
FIG. 2 is a bottom-up perspective view of a tool battery pack provided in an embodiment of the present application.
Figure 3:
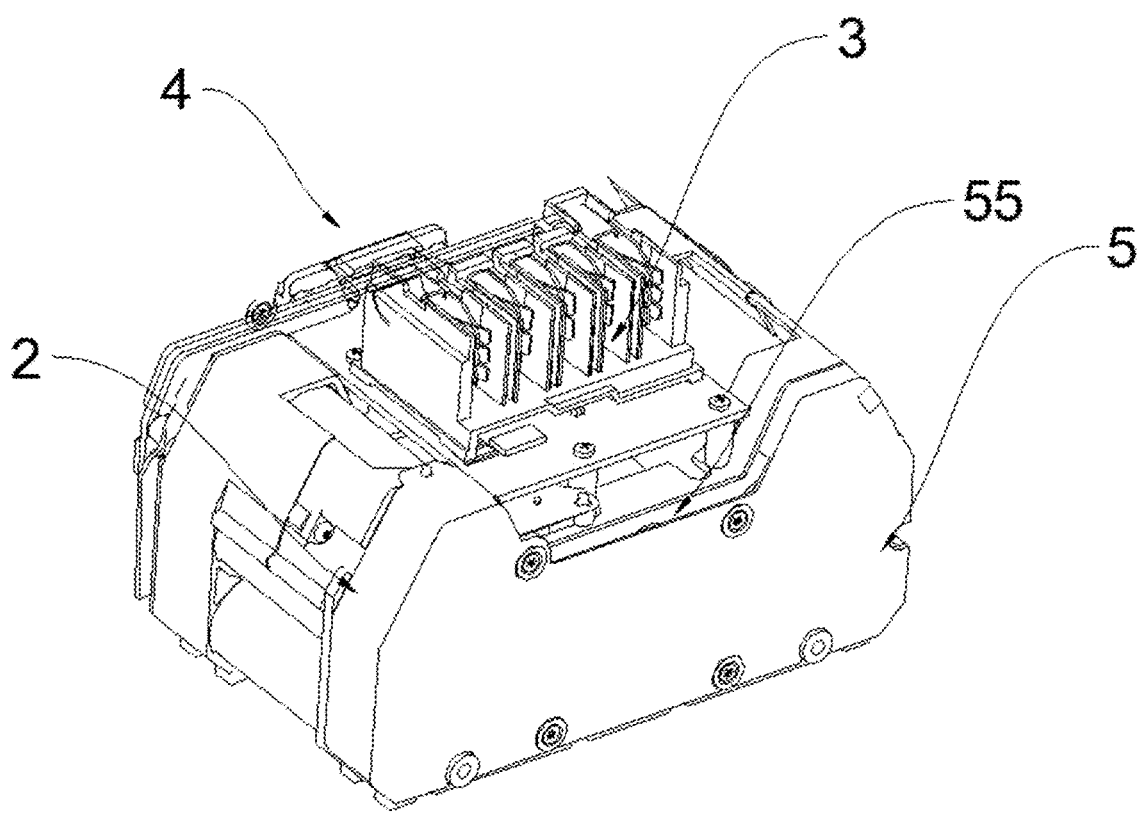
FIG. 3 is a schematic diagram of an internal structure of a tool battery pack provided in an embodiment of the present application.

As shown in FIGS. 1-3, a tool battery pack includes a housing assembly 1, a battery cell assembly 2, an electrode holder 3, and a control device 4, where the housing assembly 1 is configured to accommodate the battery cell assembly 2, the electrode holder 3, and the control device 4; and the control device 4 is connected to the electrode holder 3 and the battery cell assembly 2.

The housing assembly 1 includes a holder mounting base (not shown) and an opening 13, where the opening 13 is arranged on the housing assembly 1 corresponding to the electrode holder 3 to allow an electrode to pass through and connect with the electrode holder 3; and the holder mounting base (not shown) is arranged on at least one interior side of the housing assembly 1 to secure the battery cell assembly 2.

In an embodiment, the housing assembly 1 includes a first heat dissipation vent 11, a holder mounting base (not shown), an opening 13, and a second heat dissipation vent 14, and is configured to accommodate the battery cell assembly 2, the electrode holder 3, and the control device 4, where the opening 13 is arranged on the housing assembly 1 corresponding to the electrode holder 3 to allow an electrode to pass through and connect with the electrode holder 3, the second heat dissipation vent 14 is arranged on the side of the battery pack where the opening 13 is located, and the first heat dissipation vent 11 and the second heat dissipation vent 14 are oppositely arranged on two sides of the housing assembly 1, with the first heat dissipation vent 11 serving as an air inlet and the second heat dissipation vent 14 as an air outlet, which creates a linear airflow channel between the first heat dissipation vent 11 and the second heat dissipation vent 14, thereby enabling more efficient airflow through the battery pack, ensuring that the internal temperature of the battery pack remains within a safe range, significantly improving heat dissipation efficiency, and reducing the risk of explosion due to battery cell overheating; the holder mounting base (not shown) is arranged on at least one interior side of the housing assembly 1 to secure the battery cell assembly 2, thereby preventing a battery cell holder 24 from displacement within the housing assembly 1; and a total area of the first heat dissipation vent 11 exceeds that of the second heat dissipation vent 14 and airflow enters the housing assembly 1 through the first heat dissipation vent 11 and exits through the second heat dissipation vent 14, thereby facilitating intake of more cooling air through the larger first heat dissipation vent 11 and ensuring sufficient contact between the cooling air and the battery cell assembly 2.

Figure 4:
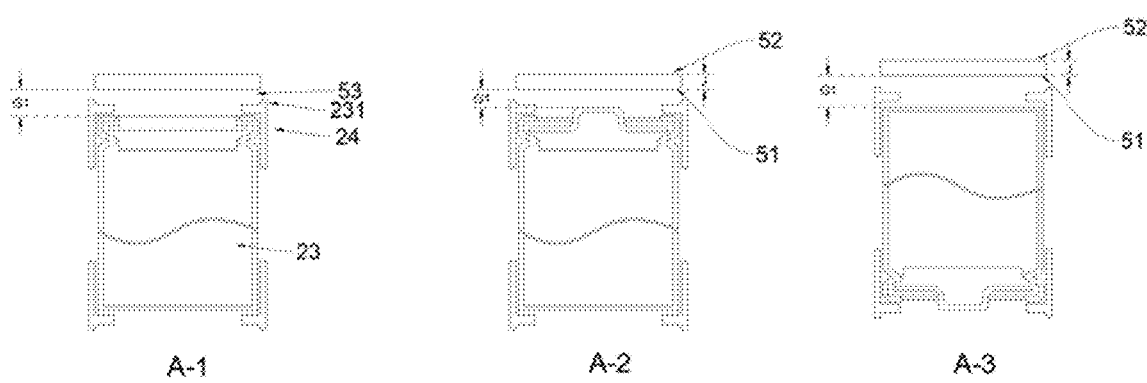
FIG. 4 is a sectional view showing an assembly relationship between a local barrier, a battery cell holder, and a unit battery cell of a tool battery pack provided in an embodiment of the application.
Figure 5:
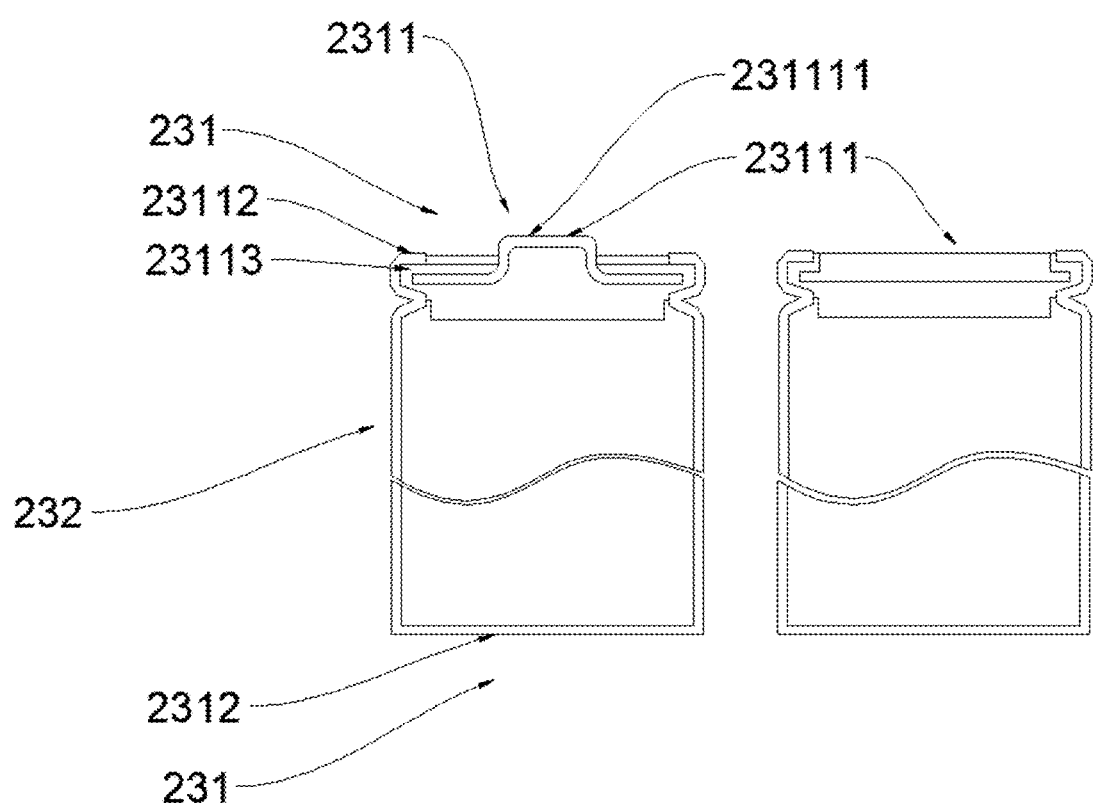
FIG. 5 is a sectional view of a unit battery cell provided in an embodiment of the present application.
Figure 6:
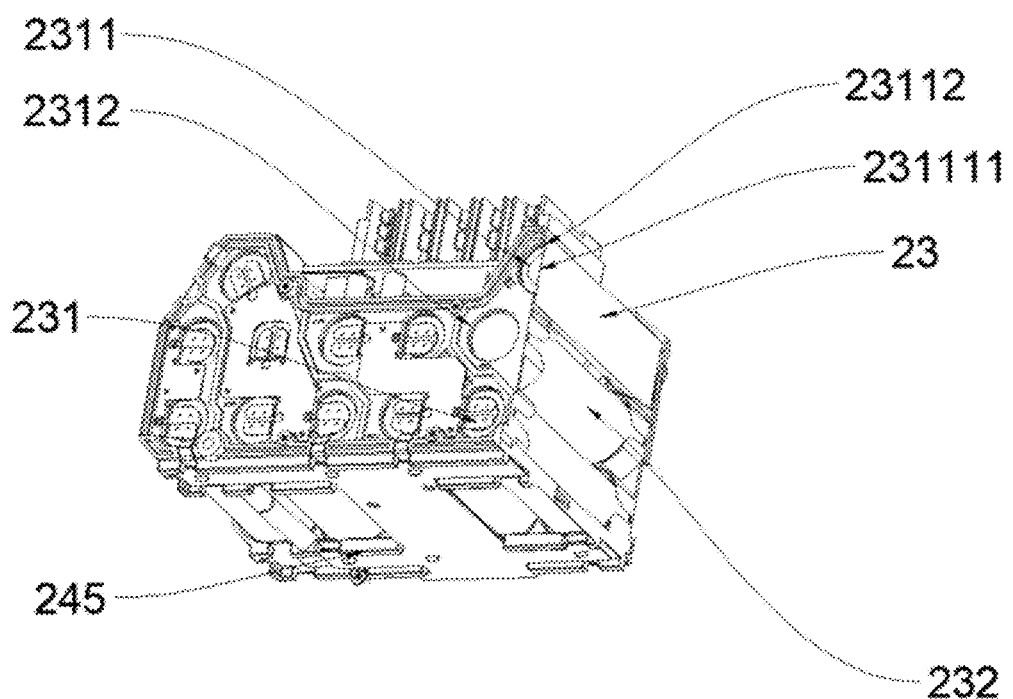
FIG. 6 is a partial sectional view of an internal structure of a tool battery pack provided in an embodiment of the present application, with a waterproof layer and a barrier hidden.

As shown in FIGS. 4-6, the battery cell assembly 2 includes a unit battery cell 23 and a battery cell holder 24, where the unit battery cell 23 has a battery cell end face 231 and a battery cell body 232, and the battery cell end face 231 includes a first battery cell end face 2311 and a second battery cell end face 2312.

In an embodiment, as shown in FIG. 5, the unit battery cell 23 is a cylindrical battery cell; the first battery cell end face 2311 has a positive end face 23111, which is a flat end face; and the second battery cell end face 2312 is a negative end face.

In an embodiment, as shown in FIG. 5, the unit battery cell 23 is a cylindrical battery cell; the first battery cell end face 2311 has a positive end face 23111 provided with a cap end face 231111, where the cap end face 231111 protrudes outward from the positive end face 23111; and the second battery cell end face 2312 is a negative end face.

In an embodiment, as shown in FIG. 5, the unit battery cell 23 is a cylindrical battery cell; and the first battery cell end face 2311 has a positive end face 23111 and a negative end face 23112, where an isolating member 23113 is arranged between the negative end face 23112 and the positive end face 23111 to isolate a positive electrode from a negative electrode, thereby avoiding short circuits.

Figure 7:
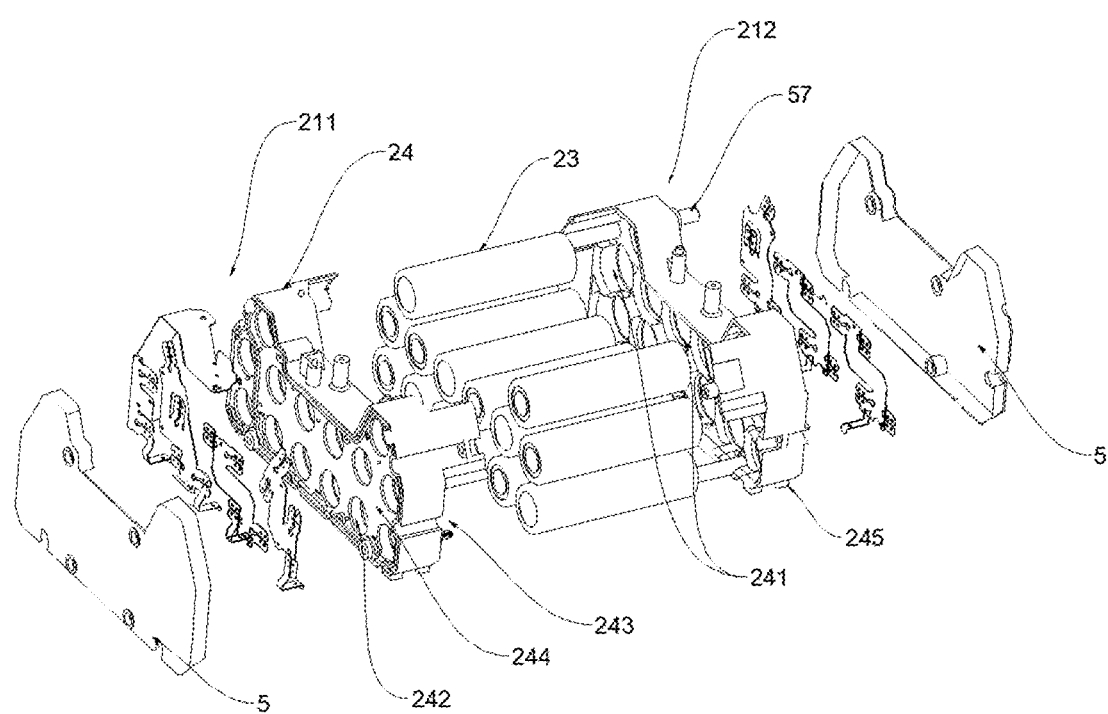
FIG. 7 is a sectional view showing an assembly relationship between a barrier, a battery cell holder, and a unit battery cell of a tool battery pack provided in an embodiment of the present application.

As shown in FIG. 7, the battery cell holder 24 is provided with an accommodating slot 241, an exposed hole 242, a first end 243, and a second end 244, where the accommodating slot 241 is arranged at the first end 243 of the battery cell holder 24 to accommodate the unit battery cell 23, a slot for accommodating the unit battery cell 23 is formed at an end of the accommodating slot 241, and the exposed hole 242 extending through the battery cell holder 24 is formed at another end of the accommodating slot 241; the exposed hole 242 is arranged at the second end 244; an inner area of the exposed hole 242 is less than a cross-sectional area of the accommodating slot 241 parallel to the exposed hole 242; an area of the exposed hole 242 is less than a maximum area of the battery cell end face extending into the accommodating slot 241; the end of the battery cell holder 24 with the exposed hole 242 is the battery cell assembly end face; a shape of the exposed hole 242 includes but is not limited to circular, oval, and square shapes; and the battery cell holder 24 is firmly fixed to the holder mounting base 12 in the housing assembly 1 by means of, but not limited to, welding or screw connection to provide additional structural support and anti-vibration protection.

As shown in FIG. 7, in an embodiment, the battery cell holder 24 is provided with a limiting portion 245 configured to fit with the holder mounting base 12, and the limiting portion 245 includes a locking member, which may take various forms, including but not limited to a screw hole tightened with a screw, a first mortise-tenon structure engaged with a second mortise-tenon structure on the housing assembly 1, welding the limiting portion 245 onto the housing assembly 1, or adhesive bonding, thereby preventing the battery cell holder 24 from displacement within the housing assembly 1.

The battery cell holder 24 is firmly fixed to the holder mounting base 12 in the housing assembly 1 by means of, but not limited to, welding or screw connection to provide additional structural support and anti-vibration protection.

As shown in FIGS. 1-3, the electrode holder 3 is provided with a terminal assembly 32 and a terminal mounting base 33, where the terminal assembly 32 is installed within the terminal mounting base 33, and the terminal mounting base 33 is configured to position the terminal assembly 32; the terminal mounting base 33 is fixedly connected to the control board, while the terminal assembly 32 is connected to the control device 4; and the terminal mounting base 33 is provided with a guide slot 331 for directing correct insertion of an electrode, preventing installation errors that could lead to short circuits, while also securing the electrode to ensure effective connection with the control device 4.

As shown in FIG. 3, the control device 4 is arranged on the battery cell holder 24 and includes a control board 41 and a connecting member 42, where the control board 41 at least includes a control module and a communication module, and is connected to the unit battery cell 23 via the connecting member 42 through the exposed hole 242 to enable communication and control functions; the control module is configured to regulate parameters such as voltage, current, and temperature within the tool battery pack to ensure safe and efficient system operation; and the communication module is configured to conduct data exchange with external devices to achieve monitoring of the tool battery pack's operating status.

A tool battery pack further includes a thermally conductive barrier 5, where "thermally conductive" refers to the barrier's thermal conduction capability under steady-state thermal transfer conditions, technically characterized by a thermal conductivity greater than or equal to 5 W/(m·K). The barrier 5 is arranged at the battery cell assembly end face via a positioning connector 57. As shown in FIG. 4, the battery cell assembly end face is configured as a reference plane, and the barrier 5 includes a first end face 51 closer to the reference plane and a second end face 52 away from the reference plane, where a distance G1 exists between the first end face 51 and the battery cell assembly end face, forming a pressure relief space 53 therebetween, and the pressure relief space 53 includes at least one pressure relief outlet 55. Through a cooperative structure of the accommodating slot 241 and the exposed hole 242, each unit battery cell 23 forms an independent air chamber, which, combined with the compartmentalizing and isolating effect of the barrier 5, can confine the thermal runaway impact range of a unit battery cell within two adjacent unit battery cells. The pressure relief space formed between the barrier 5 and the battery cell assembly end face, combined with the pressure relief outlet, establishes a directional pressure relief mechanism, which can direct high-temperature gases and flames caused by thermal runaway toward a predefined safe area, effectively mitigating internal pressure buildup risks while providing a dual effect of protection and isolation. Moreover, the thermally conductive barrier 5 not only acts as a physical shield against direct flame impingement on the housing and/or adjacent battery cells but also rapidly dissipates local heat across the entire battery pack's heat dissipation system by virtue of its thermal conduction characteristics, enabling flame quenching in gaps due to metal surface cooling effects and containment of solid molten debris within the pressure relief space, thereby preventing ejection toward the adjacent battery cells. As a result, the entire battery pack can significantly reduce fire or explosion risks during thermal runaway of a unit battery cell and improve overall reliability and safety.

As shown in FIG. 7, in an embodiment, the barrier 5 is arranged at the battery cell assembly end face 211 via a positioning connector 57. The positioning connector 57 may be but is not limited to a positioning post, a positioning hole, or a concave-convex engagement structure arranged at the barrier 5 and/or the battery cell holder 24. The barrier 5 is connected to the battery cell assembly 2 through welding, screw connection, adhesive bonding, snap-fit engagement, or similar methods, ensuring a secured fit; or, it is connected to the housing assembly 1 through welding, screw connection, snap-fit engagement, adhesive bonding, or similar methods, ensuring a secured fit. The positioning connector enables a secured fit between the barrier 5 and the battery cell assembly 2 or the housing assembly 1, preventing relative movement between the assemblies, enhancing structural stability of the entire battery pack, and reducing displacement or detachment risks caused by vibration or impact.

The above configuration is an optional implementation for arranging the barrier 5. The battery cell assembly 2 may be configured in other alternative structures, as long as the barrier 5 can be arranged at the battery cell end face. The battery cell end face is configured as a reference plane, and the barrier 5 has a first end face closer to the reference plane and a second end face away from the reference plane, where a distance G1 exists between the first end face and the battery cell end face, forming a pressure relief space therebetween.

As shown in FIG. 4, in an embodiment, a distance G1 between the first end face 51 and the positive end face 23111 or the cap end face 231111 or the negative end face 23112 of the battery cell assembly end face is greater than or equal to 1 mm and less than 10 mm. By setting the distance G1 to form a pressure relief space, an effective buffer area is created between oppositely arranged battery cell end faces. This design limits the heat dissipation capability of a unit battery cell undergoing thermal runaway within the entire tool battery pack, which is a critical factor in ensuring the safety of the tool battery pack. By precisely controlling the distance G1, it can effectively block initial thermal surges while directing them toward the designated pressure relief space. This design can effectively limit thermal propagation effects from the unit battery cell undergoing thermal runaway to adjacent unit battery cells 23 and/or the housing assembly 1 in front, rear, left, and right directions, thereby delaying or preventing thermal runaway propagation from the unit battery cell throughout the entire tool battery pack to a certain extent; moreover, it maintains a compact size of the entire tool battery pack, ensuring compatibility with existing tools and devices without compromising safety or performance. The standardized distance also simplifies and streamlines production and assembly processes, enhancing operational efficiency.

Figure 8:
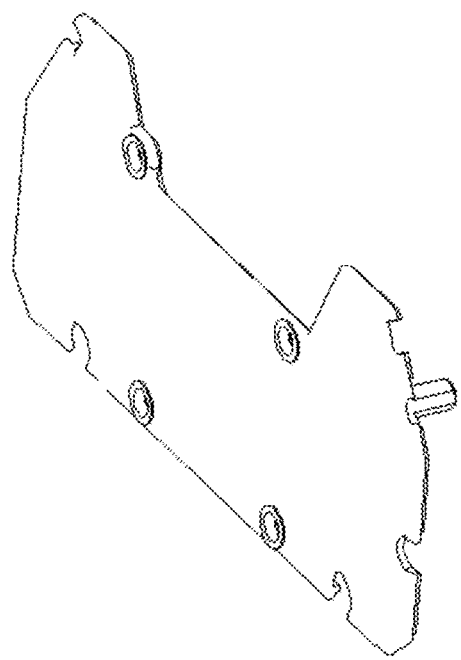
FIG. 8 is a schematic diagram of a barrier of a tool battery pack provided in an embodiment of the present application.
Figure 9:
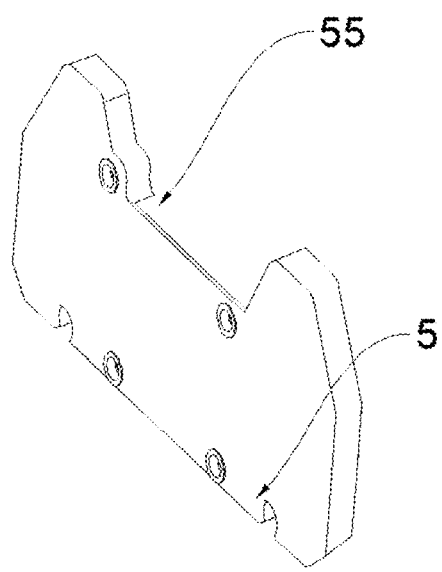
FIG. 9 is a schematic diagram of a barrier of a tool battery pack provided in an embodiment of the present application.

As shown in FIGS. 8-9, in an embodiment, the barrier 5 is a grooved barrier or a flat-plate barrier, forming a pressure relief space with each battery cell assembly end face, and the pressure relief space includes at least one pressure relief outlet 55, where the pressure relief outlet 55 may be arranged at the barrier 5, at the battery cell assembly end face, and/or at the battery cell holder 24, and is arranged on a side of the pressure relief space; and the pressure relief outlet 55 is not parallel to the battery cell end face within the battery cell assembly end face. The grooved or flat-plate barrier 5 can reduce manufacturing complexity and costs, facilitating easier production and simpler assembly between battery cell assemblies and enabling rapid assembly and formation of an effective pressure relief space. The pressure relief outlet 55 provides a defined pressure relief pathway for the pressure relief space, effectively preventing excessive pressure buildup within the battery cell assembly 2 and thereby reducing the risk of damage to adjacent unit battery cells 23 from the unit battery cell 23 undergoing thermal runaway. The pressure relief outlet 55 can be arranged at the barrier 5, at the battery cell assembly end face, or at the battery cell holder 24, offering multiple pressure relief pathway options. The arrangement of pressure relief outlets on different assemblies allows flexible adjustment according to the tool battery pack's specific design and thermal management requirements, thereby optimizing pressure relief effects and reducing internal pressure buildup while helping maintain the physical integrity and stability of the tool battery pack to prevent structural damage and potential safety incidents caused by excessive pressure. When combined with the grooved or flat-plate barrier 5, the pressure relief space not only facilitates pressure relief but also assists in channeling thermal surges to some extent, thereby further slowing down the propagation speed of thermal runaway.

In an embodiment, the barrier 5 is a grooved barrier or a flat-plate barrier, forming a pressure relief space with each battery cell assembly end face, and the pressure relief space includes at least one pressure relief outlet 55, where the pressure relief outlet 55 is arranged at the barrier 5 and located in an area other than the battery cell end face 231 between unit battery cells 23, and the pressure relief outlet 55 is parallel to the battery cell end face within the battery cell assembly end face. The grooved or flat-plate barrier 5 can reduce manufacturing complexity and costs, facilitating easier production and simpler assembly between battery cell assemblies and enabling rapid assembly and formation of an effective pressure relief space. The pressure relief outlet 55 is designed to be arranged at the barrier 5 and located in an area other than the battery cell end face between unit battery cells. This parallel configuration relative to the battery cell assembly end face ensures a direct and smooth pressure relief pathway. During thermal runaway, the pressure relief space enables rapid and efficient internal pressure relief directly from the affected unit battery cell along the pathway parallel to the battery cell assembly end face, thereby rapidly mitigating local temperature spikes and preventing instant heat accumulation.

In an embodiment, a projected area of the end face of the barrier 5 is greater than and can completely cover a maximum projected area of the battery cell assembly end face adjacent to the barrier. By ensuring the barrier 5 is greater than the maximum projected area of the battery cell assembly end face adjacent to the barrier, the barrier 5 can completely cover the maximum projected area of the battery cell assembly end face, enabling superior management and control of thermal diffusion pathways. This design limits direct thermal transfer to adjacent unit battery cells, thereby effectively reducing thermal runaway propagation risks.

In an embodiment, a projected area of the end face of the barrier 5 is less than a maximum projected area of the battery cell assembly end face adjacent to the barrier and greater than or equal to projected areas of maximum outlines of all battery cell end faces within the battery cell assembly end face. As a result, the barrier 5 can completely cover the maximum projected area of the battery cell assembly end face, enabling superior management and control of thermal diffusion pathways. This design limits direct thermal transfer to adjacent unit battery cells, thereby effectively reducing thermal runaway propagation risks. By providing comprehensive protection across projected areas of battery cells, it effectively limits thermal transfer during thermal runaway, thereby ensuring effective protection for the battery cell assembly.

In an embodiment, the barrier 5 is an integrally formed or split structure. The integrally formed barrier 5 offers superior structural integrity by eliminating potential weak connection points inherent in the split structure and, without additional splice joints or bonding points, it achieves higher overall strength that can better withstand external impacts and pressures, thereby enhancing durability and stability of the tool battery pack; conversely, the split structure allows for design and material selection of individual assemblies to meet specific requirements. This flexibility enables better adaptation to design requirements and dimensional variations of different tool battery packs. When damage occurs to a specific part, the split-type barrier allows for easier local replacement and repair without requiring replacement of the entire barrier, thereby reducing maintenance costs and downtime.

In an embodiment, the unit battery cell 23 includes a battery cell end face 231 and a battery cell body 232, and a thickness J of a part of the barrier 5 corresponding to the battery cell end face is greater than or equal to 0.8 mm and less than or equal to 3 mm. When the thickness J of the part of the barrier is within a range of 0.8 mm to 3 mm, sufficient space can be provided for pressure relief while maintaining structural strength. This thickness design effectively guides and releases pressure under extreme conditions (such as thermal runaway) while maintaining a sufficient thermal isolation capability to slow thermal conduction between adjacent battery cells, thereby enhancing battery system safety; in addition, it can ensure the barrier provides structural support and isolation without adding excessive weight or occupying excessive space, preserving the overall lightweight and compactness of the tool battery pack.

In an embodiment, the battery cell end face 231 includes a first battery cell end face 2311 and a second battery cell end face 2312, and the battery cell assembly end face includes at least two battery cell end faces 231 corresponding to at least two unit battery cells, where a thickness J of a part of the barrier 5 corresponding to the battery cell end face 231 is 0.8 mm to 3 mm, and a thickness of a part of the barrier 5 corresponding to the first battery cell end face 2311 is the same as that corresponding to the second battery cell end face 2312. By controlling the same thickness, it simplifies production.

In an embodiment, the battery cell end face 231 includes a first battery cell end face 2311 and a second battery cell end face 2312, and the battery cell assembly end face includes at least two battery cell end faces corresponding to at least two unit battery cells, where a thickness J of a part of the barrier 5 corresponding to the battery cell end face 231 is 0.8 mm to 3 mm, and a difference between a thickness of a part of the barrier 5 corresponding to the first battery cell end face 2311 and a thickness of a part of the barrier 5 corresponding to the second battery cell end face 2312 is less than or equal to 1 mm. By controlling the difference between the thicknesses of the parts of the barrier 5 corresponding to the first and second battery cell end faces 2311, 2312, since the thicker barrier 5 in high-frequency thermal runaway areas contains more materials and has a higher local heat capacity, it can absorb greater thermal energy and delay temperature rise rates, and its thermal conduction pathway can rapidly direct heat to the heat dissipation structure of the housing assembly 1, preventing heat accumulation; conversely, the thinner barrier 5 in low-frequency thermal runaway areas prioritizes heat dissipation efficiency, preventing abnormal local temperature spikes through rapid thermal conduction, thereby achieving differentiated pressure relief space responses.

In an embodiment, the battery cell end face 231 includes a first battery cell end face 2311 and a second battery cell end face 2312, and the battery cell assembly end face includes at least two battery cell end faces 231 corresponding to at least two unit battery cells, where a thickness J of a part of the barrier 5 corresponding to the battery cell end face 231 is 0.8 mm to 3 mm, and a thickness of a part of the barrier 5 corresponding to the first battery cell end face 2311 is greater than that corresponding to the second battery cell end face 2312. By designing the barrier with uneven thicknesses, it can provide customized solutions according to specific thermal management needs of each battery cell. For example, the first battery cell end face 2311 is a high-frequency thermal runaway area that ejects high-temperature and high-pressure gases, where the barrier 5 is relatively thicker, creating a smaller pressure relief space to provide greater resistance to the initial high-pressure gas eruption during thermal runaway, thereby slowing down gas velocity and reducing direct impact on the pressure relief outlet; conversely, the second battery cell end face 2312 is a low-frequency thermal runaway area that also ejects high-temperature and high-pressure gases, where the barrier 5 is relatively thinner, forming a larger pressure relief space to contain more gas expansion and buffer pressure fluctuations, thereby achieving differentiated pressure relief space responses.

Figure 10:
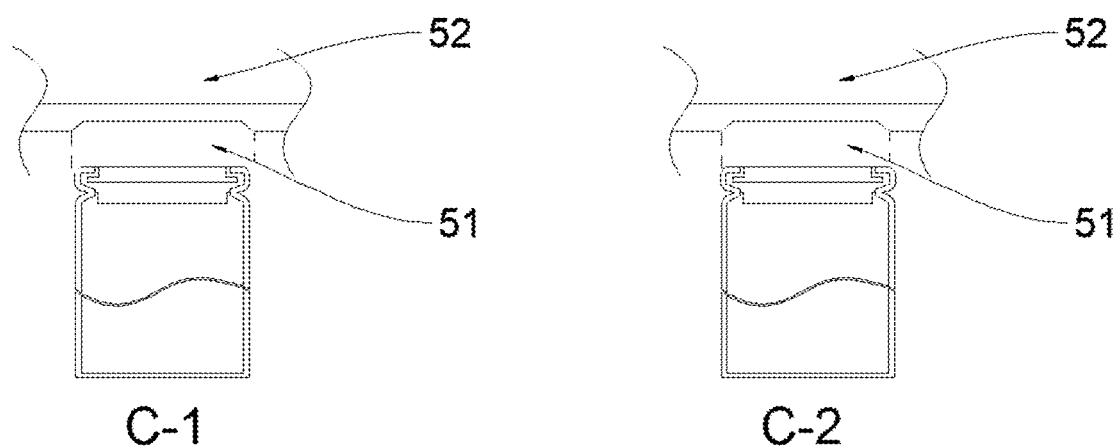
FIG. 10 is a schematic diagram showing a dimensional relationship between a battery cell end face and a barrier provided in an embodiment of the present application.

As shown by C-1 in FIG. 10, in an embodiment, a battery cell assembly end face adjacent to the barrier 5 is configured as a reference plane, the barrier 5 includes a first end face 51 closer to the reference plane and a second end face 52 away from the reference plane, and a part of the first end face 51 corresponding to the battery cell end face 231 is provided with a convex structure away from the reference plane, where a maximum outline of the convex structure is greater than or equal to the battery cell end face 231. The adoption of the convex structure can increase the distance between the battery cell assembly end face and the end face of the barrier 5, thereby expanding the width of the pressure relief space. As a result, the expanded pressure relief space can more effectively contain and mitigate gases or heat released by the battery cell during abnormal conditions, preventing safety hazards caused by excessive pressure buildup. Additionally, the convex structure provides greater surface area, which facilitates more efficient heat dissipation through natural convection. The battery cell will generate heat during charging/discharging; therefore, a well-designed heat dissipation structure can keep the battery cell within a safe operating temperature range and improve thermal management efficiency.

As shown by C-2 in FIG. 10, in an embodiment, a battery cell assembly end face adjacent to the barrier 5 is configured as a reference plane, the barrier 5 includes a first end face 51 closer to the reference plane and a second end face 52 away from the reference plane, and a part of the first end face 51 corresponding to the battery cell end face 231 is provided with a convex structure away from the reference plane, where a maximum outline of the convex structure is smaller than the battery cell end face 231. The adoption of the convex structure can increase the distance between the battery cell assembly end face and the end face of the barrier 5, thereby expanding the width of the pressure relief space. As a result, the expanded pressure relief space can more effectively contain and mitigate gases or heat released by the battery cell during abnormal conditions, preventing safety hazards caused by excessive pressure buildup. Additionally, the convex structure provides greater surface area, which facilitates more efficient heat dissipation through natural convection. The battery cell will generate heat during charging/discharging; therefore, a well-designed heat dissipation structure can keep the battery cell within a safe operating temperature range and improve thermal management efficiency.

Figure 11:
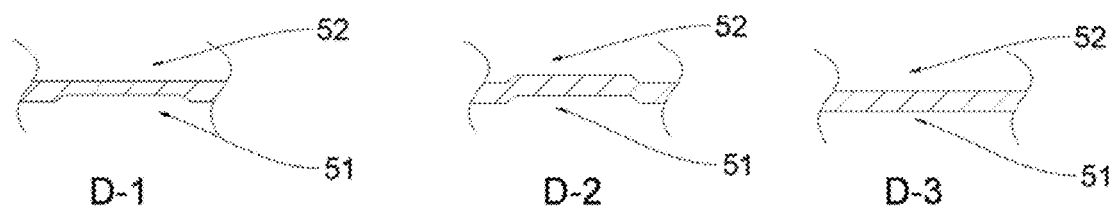
FIG. 11 is a partial sectional view of a barrier of a tool battery pack provided in an embodiment of the present application.

As shown by D-1 in FIG. 11, in an embodiment, a battery cell assembly end face adjacent to the barrier 5 is configured as a reference plane, the barrier 5 includes a first end face 51 closer to the reference plane and a second end face 52 away from the reference plane, and a part of the first end face 51 corresponding to the battery cell end face 231 is provided with a convex structure away from the reference plane. The adoption of the convex structure can increase the distance between the battery cell assembly end face and the end face of the barrier 5, thereby expanding the width of the pressure relief space. As a result, the expanded pressure relief space can more effectively contain and mitigate gases or heat released by the battery cell during abnormal conditions, preventing safety hazards caused by excessive pressure buildup. Additionally, the convex structure provides greater surface area, which facilitates more efficient heat dissipation through natural convection. The battery cell will generate heat during charging/discharging; therefore, a well-designed heat dissipation structure can keep the battery cell within a safe operating temperature range and improve thermal management efficiency.

As shown by D-2 in FIG. 11, in an embodiment, a battery cell assembly end face adjacent to the barrier 5 is configured as a reference plane, the barrier 5 includes a first end face 51 closer to the reference plane and a second end face 52 away from the reference plane, and parts of the first and second end faces 51, 52 corresponding to the battery cell end face 231 are provided with a convex structure away from the reference plane. The adoption of the convex structure can increase the distance between the battery cell assembly end face and the end face of the barrier 5, thereby expanding the width of the pressure relief space. As a result, the expanded pressure relief space can more effectively contain and mitigate gases or heat released by the battery cell during abnormal conditions, preventing safety hazards caused by excessive pressure buildup. Additionally, the convex structure provides greater surface area, which facilitates more efficient heat dissipation through natural convection. The battery cell will generate heat during charging/discharging; therefore, a well-designed heat dissipation structure can keep the battery cell within a safe operating temperature range and improve thermal management efficiency.

As shown by D-3 in FIG. 11, in an embodiment, a battery cell assembly end face adjacent to the barrier 5 is configured as a reference plane, the barrier 5 includes a first end face 51 closer to the reference plane and a second end face 52 away from the reference plane, and parts of the first and second end faces 51, 52 are flat.

In an embodiment, the barrier 5 is made of a thermally conductive material with an ignition point higher than or equal to 300° C. The thermally conductive material with an ignition point higher than or equal to 300° C. ensures structural integrity of the barrier in high-temperature environments or during thermal runaway of a unit battery cell, resisting combustion or decomposition to enhance battery system safety; in addition, by using the thermally conductive material, the barrier 5 can effectively conduct heat from the unit battery cell quickly, helping balance temperatures between battery cells and prevent local overheating. With its superior thermal conductivity properties, it prevents excessive temperature rise caused by heat accumulation within the battery, thereby reducing thermal runaway risks.

In an embodiment, the barrier 5 is made of a rigid material with an ignition point higher than or equal to 300° C. The rigid material with an ignition point higher than or equal to 300° C. ensures structural integrity of the barrier in high-temperature environments or during thermal runaway of a unit battery cell, resisting combustion or decomposition to enhance battery system safety; in addition, the rigid material provides superior thermal resistance, effectively blocking flame propagation and thermal conduction to adjacent battery cells, thereby reducing thermal runaway propagation risks. Under extreme conditions, the rigid material can serve as a fireproof barrier, protecting internal battery cells from external heat sources or thermal effects generated by other battery cells.

In an embodiment, the barrier 5 is made of a thermally conductive material with a thermal conductivity greater than or equal to 5 W/(m·K). By using the thermally conductive material with a thermal conductivity greater than or equal to 5 W/(m·K), the barrier 5 can effectively conduct heat from the unit battery cell quickly, helping balance temperatures between battery cells and prevent local overheating. With its superior thermal conductivity properties, it prevents excessive temperature rise caused by heat accumulation within the battery, thereby reducing thermal runaway risks.

In an embodiment, the barrier is made of a metal material, and the distance G1 is greater than or equal to 1 mm and less than 10 mm. The metal barrier forms a non-contact thermal conduction channel with the battery cell end face through the distance G1, enabling rapid lateral dissipation of local heat to a heat dissipation surface of the housing during thermal runaway.

In an embodiment, the pressure relief airflow from the pressure relief outlet 55 is discharged through the second heat dissipation vent 14. During thermal runaway, high-temperature and/or high-pressure gases from the pressure relief outlet 55 are directionally discharged through the second heat dissipation vent 14 (air outlet), creating a co-directional superposition effect between the pressure relief airflow and the heat dissipation airflow at the outlet, thereby accelerating the removal of hazardous gases from the battery pack's core area and preventing internal gas retention.

In an embodiment, the pressure relief airflow from the pressure relief outlet passes through the second heat dissipation vent 14 made of a plastic material.

In an embodiment, the pressure relief airflow from the pressure relief outlet passes through the second heat dissipation vent 14 made of a metal material. When high-temperature gases flow through the metal heat dissipation vent, heat is rapidly conducted through a metal surface to either the housing of the battery pack or the external environment, thereby reducing the temperature of discharged gases and mitigating thermal damage to surrounding components. Functioning as an auxiliary heat dissipation channel, the metal heat dissipation vent works in synergy with the barrier's thermal conduction pathway to accelerate overall heat dissipation inside the battery pack.

Figure 14:
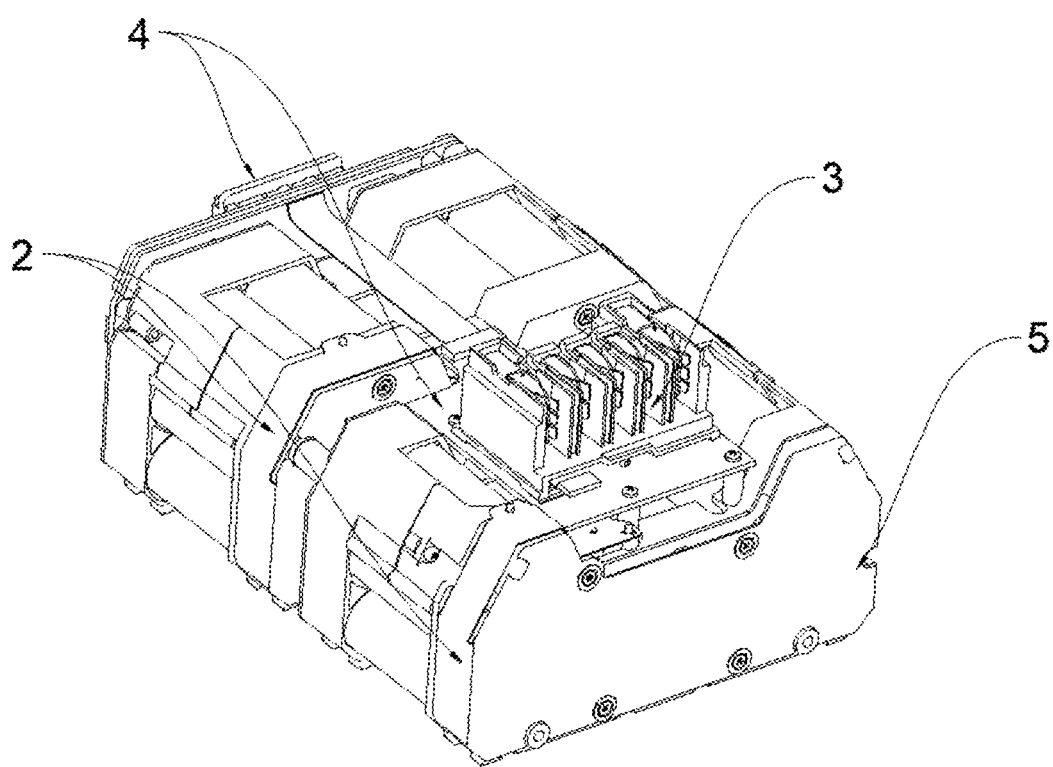
FIG. 14 is a schematic diagram of an internal structure of a tool battery pack provided in an embodiment of the present application.
Figure 15:
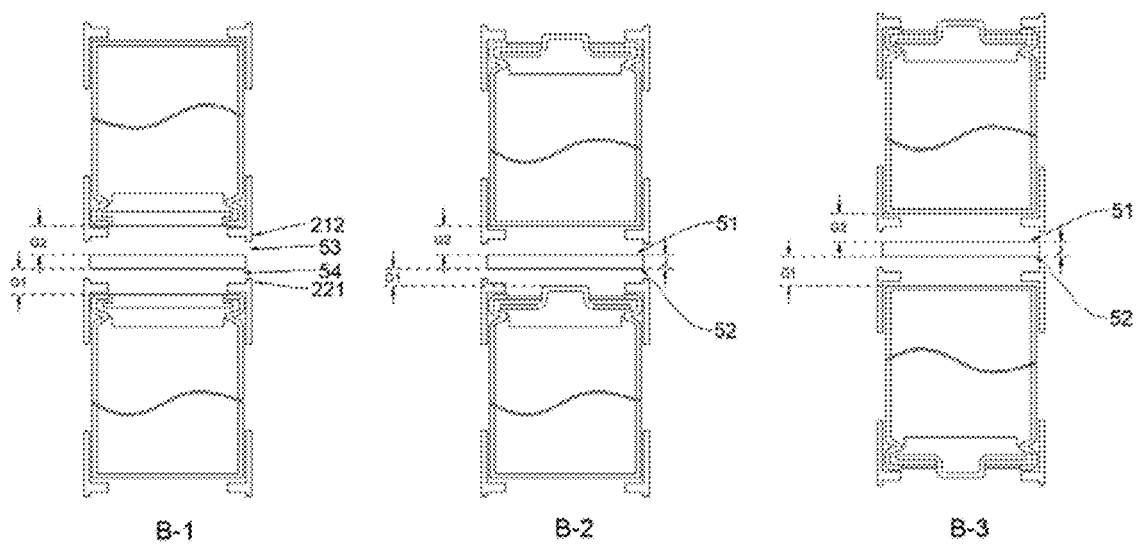
FIG. 15 is a sectional view showing an assembly relationship between a barrier, a battery cell holder, and a unit battery cell of a tool battery pack provided in an embodiment of the present application.
Figure 16:
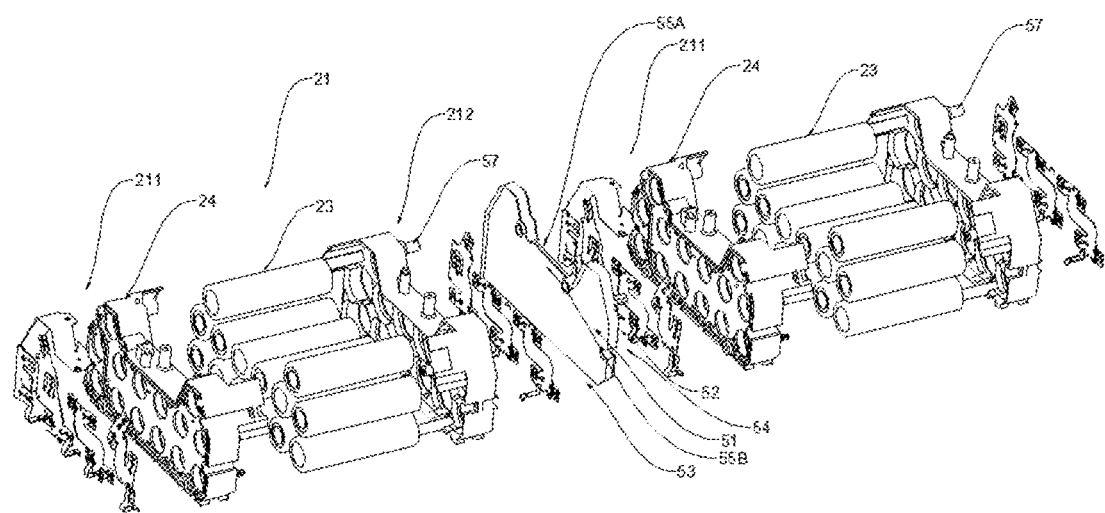
FIG. 16 is an exploded view showing an assembly relationship between a barrier, a battery cell holder, and a unit battery cell of a tool battery pack provided in an embodiment of the present application.

In an embodiment, the pressure relief airflow from the pressure relief outlet passes through the second heat dissipation vent 14 provided with a pressure relief valve. During normal operation, the vent functions as a conventional heat dissipation channel to help maintain a normal operating temperature. When excessive pressure occurs, the pressure relief valve is activated to direct and discharge the airflow through the vent, thereby achieving pressure relief. FIGS. 14-16 are schematic structural diagrams of a tool battery pack provided in an embodiment of the present application.

An Embodiment of a Tool Battery Pack

A tool battery pack includes a housing assembly 1, a battery cell assembly 2, an electrode holder 3, and a control device 4.

The housing assembly 1 includes a holder mounting base (not shown) and an opening 13, and is configured to accommodate the battery cell assembly, the electrode holder, and the control device; the opening 13 is arranged on the housing assembly 1 corresponding to the electrode holder 3 to allow an electrode to pass through and connect with the electrode holder 3; and the holder mounting base (not shown) is arranged on at least one interior side of the housing assembly 1 to secure the battery cell assembly 2.

As shown in FIGS. 14-16, the battery cell assembly 2 includes a first battery cell assembly 21, a second battery cell assembly 22, a unit battery cell 23, a battery cell holder 24, and a battery cell assembly connecting member 27.

The first battery cell assembly 21 includes a first battery cell assembly end face 211 and a second battery cell assembly end face 212, and the second battery cell assembly 22 includes a third battery cell assembly end face 221 and a fourth battery cell assembly end face 222, where the third battery cell assembly end face 221 and the second battery cell assembly end face 212 are oppositely arranged; the first battery cell assembly 21 is connected to the second battery cell assembly via the battery cell assembly connecting member 27; each battery cell assembly end face at least includes a battery cell holder end face and each battery cell end face 231; and the battery cell assembly connecting member 27 includes, but is not limited to, a connecting post that secure two sets of battery cell assemblies through screw connection or adhesive bonding, or an engagement mechanism such as gear teeth for positional retention.

As shown in FIG. 6, the unit battery cell 23 is a cylindrical battery cell having a battery cell end face 231 and a battery cell body 232, where battery cell end face 231 includes a first battery cell end face 2311 and a second battery cell end face 2312.

In an embodiment, the first battery cell end face 2311 has a positive end face 23111, which is a flat end face; and the second battery cell end face 2312 is a negative end face.

In an embodiment, the first battery cell end face 2311 has a positive end face 23111 provided with a cap end face 231111, where the cap end face 231111 protrudes outward from the positive end face 23111; and the second battery cell end face 2312 is a negative end face.

In an embodiment, the first battery cell end face 2311 has a positive end face 23111 and a negative end face 23112, where an isolating member 23113 is arranged between the negative end face 23112 and the positive end face 23111 to isolate the positive electrode from the negative electrode, thereby avoiding short circuits; and the second battery cell end face 2312 is a negative end face, where a first edge, which is an edge of the negative end face 23112 closer to a central axis of the unit battery cell 23, is exposed from the exposed hole 242, and a projection distance c between the first edge and an inner edge of the exposed hole 242 is greater than or equal to 0.1 mm. By setting the distance between the exposed hole 242 and the first edge, it not only structurally enhances electrical isolation but also enables the waterproof layer 25 to cover the negative end face 23112 and the isolating member 23113. Once the isolating member 23113 becomes damaged or fails due to aging, the waterproof layer 25 serves as an additional barrier, preventing moisture ingress into the interior of the battery cell. Furthermore, by covering both the negative end face 23112 and the exposed hole 242, the waterproof layer 25 prevents moisture from penetrating through assembly gaps of the accommodating slot 241 into the battery cell end face along the length of the battery cell, thereby preventing any contact between the moisture and the positive and negative end faces 23111, 23112 to avoid potential short-circuit risks.

Each set of battery cell assembly end faces includes at least two battery cell end faces 231.

As shown in FIG. 5, the battery cell holder 24 is provided with an accommodating slot 241, an exposed hole 242, a first end 243, and a second end 244, where the accommodating slot 241 is arranged at the first end 243 of the battery cell holder 24 to accommodate the unit battery cell 23, a slot for accommodating the unit battery cell 23 is formed at an end of the accommodating slot 241, and the exposed hole 242 extending through the battery cell holder 24 is formed at another end of the accommodating slot 241; the exposed hole 242 is arranged at the second end 244; an inner area of the exposed hole 242 is less than a cross-sectional area of the accommodating slot 241 parallel to the exposed hole 242; an area of the exposed hole 242 is less than a maximum area of the battery cell end face extending into the accommodating slot 241; the exposed hole 242 is configured to expose part of the battery cell end face; a shape of the exposed hole 242 includes but is not limited to circular, oval, and square shapes; and the battery cell holder 24 is firmly fixed to the holder mounting base 12 in the housing assembly 1 by means of, but not limited to, welding or screw connection to provide additional structural support and anti-vibration protection.

As shown in FIG. 7, in an embodiment, the battery cell holder 24 is provided with a limiting portion 245 configured to fit with the holder mounting base 12, and the limiting portion 245 includes a locking member, which may take various forms, including but not limited to a screw hole tightened with a screw, a first mortise-tenon structure engaged with a second mortise-tenon structure on the housing assembly 1, welding the limiting portion 245 onto the housing assembly 1, or adhesive bonding, thereby preventing the battery cell holder 24 from displacement within the housing assembly 1.

In an embodiment, an inner height d of the exposed hole 242 is greater than or equal to 0.5 mm and less than or equal to 2.5 mm. By setting the inner height d of the exposed hole 242 to be greater than or equal to 0.5 mm, it provides effective support strength for the unit battery cell 23, thereby preventing positional displacement of the unit battery cell 23 caused by vibration or other external forces during normal use and enhancing the overall mechanical stability and safety of the tool battery pack. Additionally, keeping the height less than or equal to 2.5 mm helps reinforce the support strength while avoiding unnecessary material usage, thereby optimizing the weight of the tool battery pack and further improving energy efficiency and endurance. This height range also ensures efficient utilization of the internal space within the battery cell. While ensuring strong support, the well-designed inner height of the exposed hole avoids unnecessary occupation of the tool battery pack's effective space, allowing the tool battery pack to maximize capacity and energy density within a limited space.

The battery cell holder 24 is firmly fixed to the holder mounting base 12 in the housing assembly 1 by means of, but not limited to, welding or screw connection to provide additional structural support and anti-vibration protection.

The battery cell end faces at both ends of the unit battery cell 23 are provided with the battery cell holder 24. The battery cell holder 24 is provided with an accommodating slot 241 for accommodating the unit battery cell 23, a slot for accommodating the unit battery cell 23 is formed at a first end 2411 of the accommodating slot 241, and the exposed hole 242 extending through the battery cell holder 24 is formed at a second end 2412 of the accommodating slot 241. An inner area of the exposed hole 242 is less than a cross-sectional area of the accommodating slot 241 parallel to the exposed hole 242; and an area of the exposed hole 242 is less than a maximum area of the first battery cell end face extending into the accommodating slot 241.

The electrode holder 3 is provided with a terminal assembly 32 and a terminal mounting base 33, where the terminal assembly 32 is installed within the terminal mounting base 33, and the terminal mounting base 33 is configured to position the terminal assembly 32; the terminal mounting base 33 is fixedly connected to the control board, while the terminal assembly 32 is connected to the control device 4; and the terminal mounting base 33 is provided with a guide slot 331 for directing correct insertion of an electrode, preventing installation errors that could lead to short circuits, while also securing the electrode to ensure effective connection with the control device 4.

The control device 4 is arranged on the battery cell holder 24 and includes a control board 41 and a connecting member 42, where the control board 41 at least includes a control module and a communication module, and is connected to the unit battery cell 21 via the connecting member 42 through the exposed hole 242 to enable communication and control functions; the control module is configured to regulate parameters such as voltage, current, and temperature within the tool battery pack to ensure safe and efficient system operation; and the communication module is configured to conduct data exchange with external devices to achieve monitoring of the tool battery pack's operating status.

As shown in FIGS. 15 and 16, in an embodiment, the barrier 5 is arranged between the third battery cell assembly end face 221 and the second battery cell assembly end face 212; the third battery cell assembly end face 221 is configured as a reference plane, and the barrier 5 has a first end face 51 closer to the reference plane and a second end face 52 away from the reference plane, where a distance G1 exists between the first end face 51 and the third battery cell assembly end face 221, forming a first pressure relief space 55A therebetween, while a distance G2 exists between the second end face 52 and the second battery cell assembly end face 212, forming a second pressure relief space 55B therebetween. The first pressure relief space 55A and the second pressure relief space 55B include at least one pressure relief outlet 55. Existing tool battery packs in the conventional technology lack barriers, resulting in that end faces of unit battery cells undergoing thermal runaway eject high-temperature gases and flames toward the housing assembly 1 and/or the battery cell assembly 2 due to failure in thermal diffusion, subsequently causing damage or destruction; in contrast, in the present application, the barrier arranged between the third battery cell assembly end face 221 and the second battery cell assembly end face 212 introduces a relatively independent pressure relief space between adjacent battery cell assemblies, thereby creating a physical shield. Through a cooperative structure of the accommodating slot 241 and the exposed hole 242, each unit battery cell 23 forms an independent air chamber, which, combined with the compartmentalizing and isolating effect of the barrier 5, can confine the thermal runaway impact range of a unit battery cell within two adjacent unit battery cells. The pressure relief space formed between the barrier 5 and the battery cell assembly end face, combined with the pressure relief outlet, establishes a directional pressure relief mechanism, which can direct high-temperature gases and flames caused by thermal runaway toward a predefined safe area, effectively mitigating internal pressure buildup risks. As a result, the entire battery pack can significantly reduce fire or explosion risks during thermal runaway of a unit battery cell and improve overall reliability and safety.

As shown by B-1 in FIG. 15, in an embodiment, the third battery cell assembly end face 221 includes a first battery cell end face 2311. In a case that the battery cell end face within the second battery cell assembly end face 212 opposite to the first battery cell end face 2311 within the third battery cell assembly end face 221 is the first battery cell end face 2311 (it can be understood that in a two-cell battery cell assembly, if one battery cell in two adjacent sets of battery cell assembly end faces is positive, the battery cell end face opposite thereto is also positive), a distance G1 between the second end face 52 and the positive end face 23111 or the cap end face 231111 or the negative end face 23112 within the third battery cell assembly end face 221 is greater than or equal to 1 mm and less than 10 mm; and a distance G2 between the first end face 51 and the positive end face 23111 or the cap end face 231111 or the negative end face 23112 within the second battery cell assembly end face 212 is greater than or equal to 1 mm and less than 10 mm. By setting the distances G1 and G2 to form interval spaces between the adjacent battery cell assemblies, an effective buffer area is created between oppositely arranged negative end faces. This design limits the heat dissipation capability of a unit battery cell undergoing thermal runaway within the entire tool battery pack, which is a critical factor in ensuring the safety of the tool battery pack. By precisely controlling the distances G1 and G2, it can effectively block initial thermal surges while directing them toward the designated pressure relief space. This design can effectively limit thermal propagation effects from the unit battery cell undergoing thermal runaway to adjacent unit battery cells in front, rear, left, and right directions, thereby delaying or preventing thermal runaway propagation from the unit battery cell throughout the entire tool battery pack to a certain extent; moreover, it maintains a compact size of the entire tool battery pack, ensuring compatibility with existing tools and devices without compromising safety or performance. The standardized distances also simplify and streamline production and assembly processes, enhancing operational efficiency.

As shown by B-2 in FIG. 15, in an embodiment, the third battery cell assembly end face 221 includes a first battery cell end face 2311. In a case that the battery cell end face within the second battery cell assembly end face 212 opposite to the first battery cell end face 2311 within the third battery cell assembly end face 221 is the second battery cell end face 2312 (it can be understood that in a two-cell battery cell assembly, if one battery cell in two adjacent sets of battery cell assembly end faces is positive, the battery cell end face opposite thereto is negative), a distance G1 between the second end face 52 and the positive end face 23111 or the cap end face 231111 or the negative end face 23112 within the third battery cell assembly end face 221 is greater than or equal to 1 mm and less than 10 mm; and a distance G2 between the first end face 51 and the second battery cell end face 2312 within the second battery cell assembly end face 212 is greater than or equal to 1 mm and less than 10 mm.

By setting the distances G1 and G2 to form interval spaces between the adjacent battery cell assemblies, an effective buffer area is created between oppositely arranged negative end faces. This design limits the heat dissipation capability of a unit battery cell undergoing thermal runaway within the entire tool battery pack, which is a critical factor in ensuring the safety of the tool battery pack. By precisely controlling the distances G1 and G2, it can effectively block initial thermal surges while directing them toward the designated pressure relief space. This design can effectively limit thermal propagation effects from the unit battery cell undergoing thermal runaway to adjacent unit battery cells in front, rear, left, and right directions, thereby delaying or preventing thermal runaway propagation from the unit battery cell throughout the entire tool battery pack to a certain extent; moreover, it maintains a compact size of the entire tool battery pack, ensuring compatibility with existing tools and devices without compromising safety or performance. The standardized distances also simplify and streamline production and assembly processes, enhancing operational efficiency.

As shown by B-3 in FIG. 15, in an embodiment, the third battery cell assembly end face 221 includes a second battery cell end face 2312. In a case that the battery cell end face within the second battery cell assembly end face 212 opposite to the first battery cell end face 2311 within the third battery cell assembly end face 221 is the second battery cell end face 2312 (it can be understood that in a two-cell battery cell assembly, if one battery cell in two adjacent sets of battery cell assembly end faces is negative, the battery cell end face opposite thereto is also negative), a distance G1 between the second end face 52 and the second battery cell end face 2312 within the third battery cell assembly end face 221 is greater than or equal to 1 mm and less than 10 mm; and a distance G2 between the first end face 51 and the second battery cell end face 2312 within the second battery cell assembly end face 212 is greater than or equal to 1 mm and less than 10 mm. By setting the distances G1 and G2 to form interval spaces between the adjacent battery cell assemblies, an effective buffer area is created between oppositely arranged negative end faces. This design limits the heat dissipation capability of a unit battery cell undergoing thermal runaway within the entire tool battery pack, which is a critical factor in ensuring the safety of the tool battery pack. By precisely controlling the distances G1 and G2, it can effectively block initial thermal surges while directing them toward the designated pressure relief space. This design can effectively limit thermal propagation effects from the unit battery cell undergoing thermal runaway to adjacent unit battery cells in front, rear, left, and right directions, thereby delaying or preventing thermal runaway propagation from the unit battery cell throughout the entire tool battery pack to a certain extent; moreover, it maintains a compact size of the entire tool battery pack, ensuring compatibility with existing tools and devices without compromising safety or performance. The standardized distances also simplify and streamline production and assembly processes, enhancing operational efficiency.

In an embodiment, the distance G1 is equal to the distance G2. In this case, the symmetrical distances G1/G2 enable high-temperature gases to be discharged in parallel from both the first and second pressure relief spaces at identical flow rates during the early stage of thermal runaway, preventing local airflow vortices caused by uneven pressure relief and thereby reducing thermal surge superposition risks. The equidistant dual-pressure-relief-space design establishes a bidirectional pressure relief compensation mechanism: when abnormal gas generation occurs on one side of the battery cell assembly, the symmetrical channels automatically balance a pressure difference formed between both sides to prevent structural deformation from unilateral overpressure while suppressing thermal runaway chain reactions. The balanced pressure relief channels distribute heat uniformly along the battery pack's axial direction, and when combined with the barrier's high-temperature resistance, significantly mitigate inter-battery-cell thermal stress concentration issues.

In an embodiment, a difference $\Delta G$ between the distances G1 and G2 is less than or equal to 3 mm. The difference creates asymmetric thermal conduction pathways, enabling differentiated thermal propagation management within the spaces. By increasing the distances in high-risk areas such as positive battery cell end faces while decreasing the distances in low-risk areas such as negative battery cell end faces, the design achieves more flexible and efficient thermal management; moreover, through meticulous space management, the design enhances the tool battery pack's safety performance during thermal runaway while maintaining its structural compactness and applicability, thereby enhancing the practical effectiveness of the tool battery pack in real applications.

The barrier 5 is provided with a positioning connector 57, and the positioning connector 57 may be but is not limited to a positioning post, a positioning hole, or a concave-convex engagement structure arranged at the barrier 5. The barrier 5 is connected to the battery cell assembly 2 through welding, screw connection, adhesive bonding, snap-fit engagement, or similar methods, ensuring a secured fit; or, it is connected to the housing assembly 1 through welding, screw connection, snap-fit engagement, adhesive bonding, or similar methods, ensuring a secured fit. The positioning connector enables a secured fit between the barrier 5 and the battery cell assembly 2 or the housing assembly 1, preventing relative movement between the assemblies, enhancing structural stability of the entire battery pack, and reducing displacement or detachment risks caused by vibration or impact.

In an embodiment, the barrier 5 is a grooved barrier or a flat-plate barrier, forming a pressure relief space with each battery cell assembly end face; a pressure relief outlet 55 may be arranged at the barrier 5, at the battery cell assembly end face, and/or at the battery cell holder 24, and is arranged on a side of the pressure relief space; and the pressure relief outlet 55 is perpendicular to the battery cell end face within the battery cell assembly end face. The grooved or flat-plate barrier 5 can reduce manufacturing complexity and costs, facilitating easier production and simpler assembly between battery cell assemblies and enabling rapid assembly and formation of an effective pressure relief space. The pressure relief outlet 55 provides a defined pressure relief pathway for the pressure relief space, effectively preventing excessive pressure buildup within the battery cell assembly 2 and thereby reducing the risk of damage to adjacent unit battery cells 23 from the unit battery cell 23 undergoing thermal runaway. The pressure relief outlet 55 can be arranged at the barrier 5, at the battery cell assembly end face 231, or at the battery cell holder 24, offering multiple pressure relief pathway options. The arrangement of pressure relief outlets on different assemblies allows flexible adjustment according to the tool battery pack's specific design and thermal management requirements, thereby optimizing pressure relief effects and reducing internal pressure buildup while helping maintain the physical integrity and stability of the tool battery pack to prevent structural damage and potential safety incidents caused by excessive pressure. When combined with the grooved or flat-plate barrier 5, the pressure relief space not only facilitates pressure relief but also assists in channeling thermal surges to some extent, thereby further slowing down the propagation speed of thermal runaway.

In an embodiment, the barrier 5 is a grooved barrier or a flat-plate barrier, forming a pressure relief space with each battery cell assembly end face, and the pressure relief space includes at least one pressure relief outlet 55, where the pressure relief outlet 55 is arranged at the barrier 5 and located in an area other than the battery cell end face 231 between unit battery cells 23, and the pressure relief outlet 55 is parallel to the battery cell end face within the battery cell assembly end face. The grooved or flat-plate barrier 5 can reduce manufacturing complexity and costs, facilitating easier production and simpler assembly between battery cell assemblies and enabling rapid assembly and formation of an effective pressure relief space. The pressure relief outlet 55 is designed to be arranged at the barrier 5 and located in an area other than the battery cell end face between unit battery cells. This parallel configuration relative to the battery cell assembly end face ensures a direct and smooth pressure relief pathway. During thermal runaway, the pressure relief space enables rapid and efficient internal pressure relief directly from the affected unit battery cell along the pathway parallel to the battery cell assembly end face, thereby rapidly mitigating local temperature spikes and preventing instant heat accumulation.

In an embodiment, a projected area of the end face of the barrier 5 is greater than or equal to a maximum projected area of the battery cell assembly end face adjacent to the barrier. By ensuring the barrier 5 is greater than the maximum projected area of the battery cell assembly end face adjacent to the barrier, the barrier 5 can completely cover the maximum projected area of the battery cell assembly end face, enabling superior management and control of thermal diffusion pathways. This design limits direct thermal transfer to adjacent unit battery cells, thereby effectively reducing thermal runaway propagation risks.

In an embodiment, a projected area of the end face of the barrier 5 is less than a maximum projected area of the battery cell assembly end face adjacent to the barrier, and the barrier 5 is arranged between adjacent battery cell assemblies. Projected areas of maximum outlines of all battery cell end faces within the third battery cell assembly end face 221 are equal to those within the second battery cell assembly end face 212, and a projected area of the barrier 5 is greater than or equal to and can completely cover projected areas of maximum outlines of all battery cell end faces within the battery cell assembly end face adjacent to the barrier. As a result, the barrier 5 can completely cover the maximum projected area of the battery cell assembly end face, enabling superior management and control of thermal diffusion pathways. This design limits direct thermal transfer to adjacent unit battery cells, thereby effectively reducing thermal runaway propagation risks. By providing comprehensive protection across projected areas of battery cells, it effectively limits thermal transfer during thermal runaway, thereby ensuring effective protection for the battery cell assembly.

In an embodiment, a projected area of the end face of the barrier 5 is less than a maximum projected area of the battery cell assembly end face adjacent to the barrier, and the barrier 5 is arranged between adjacent battery cell assemblies. Projected areas of maximum outlines of all battery cell end faces within the third battery cell assembly end face 221 are less than those within the second battery cell assembly end face 212, a projected area of the barrier 5 is greater than or equal to and can completely cover the projected areas of the maximum outlines of all battery cell end faces within the second battery cell assembly end face 212. As a result, the barrier 5 can completely cover the maximum projected area of the battery cell assembly end face, enabling superior management and control of thermal diffusion pathways. This design limits direct thermal transfer to adjacent unit battery cells, thereby effectively reducing thermal runaway propagation risks. By providing comprehensive protection across projected areas of battery cells, it effectively limits thermal transfer during thermal runaway, thereby ensuring effective protection for the battery cell assembly.

In an embodiment, a projected area of the end face of the barrier 5 is less than a maximum projected area of the battery cell assembly end face adjacent to the barrier, and the barrier 5 is arranged between adjacent battery cell assemblies. Projected areas of all battery cell end faces within the third battery cell assembly end face 221 are equal to those within the second battery cell assembly end face 212 and all battery cell end faces within the third battery cell assembly end face 221 have the same outline as those within the second battery cell assembly end face 212, and the projected area of the end face of the barrier 5 is greater than or equal to and can completely cover maximum projected areas of all battery cell end faces within the battery cell assembly end face adjacent to the barrier 5. As a result, the barrier 5 can completely cover the maximum projected area of the battery cell assembly end face, enabling superior management and control of thermal diffusion pathways. This design limits direct thermal transfer to adjacent unit battery cells, thereby effectively reducing thermal runaway propagation risks. By providing comprehensive protection across projected areas of battery cells, it effectively limits thermal transfer during thermal runaway, thereby ensuring effective protection for the battery cell assembly.

In an embodiment, a projected area of the end face of the barrier 5 is less than a maximum projected area of the battery cell assembly end face adjacent to the barrier, and the barrier 5 is arranged between adjacent battery cell assemblies. Projected areas of all battery cell end faces within the third battery cell assembly end face 221 are equal to those within the second battery cell assembly end face 212 and all battery cell end faces within the third battery cell assembly end face 221 do not have the same outline as those within the second battery cell assembly end face 212, or projected areas of all battery cell end faces within the third battery cell assembly end face 221 are unequal to those within the second battery cell assembly end face 212 and all battery cell end faces within the third battery cell assembly end face 221 do not have the same outline as those within the second battery cell assembly end face 212, and the projected area of the end face of the barrier 5 is greater than or equal to a maximum projected area formed by a union of the maximum outlines of all battery cell end faces within both the second battery cell assembly end face 212 and the third battery cell assembly end face 221. As a result, the barrier 5 can completely cover the maximum projected area of the battery cell assembly end face, enabling superior management and control of thermal diffusion pathways. This design limits direct thermal transfer to adjacent unit battery cells, thereby effectively reducing thermal runaway propagation risks. By providing comprehensive protection across projected areas of battery cells, it effectively limits thermal transfer during thermal runaway, thereby ensuring effective protection for the battery cell assembly.

In an embodiment, the barrier 5 is an integrally formed or split structure. The integrally formed barrier 5 offers superior structural integrity by eliminating potential weak connection points inherent in the split structure and, without additional splice joints or bonding points, it achieves higher overall strength that can better withstand external impacts and pressures, thereby enhancing durability and stability of the tool battery pack; conversely, the split structure allows for design and material selection of individual assemblies to meet specific requirements. This flexibility enables better adaptation to design requirements and dimensional variations of different tool battery packs. When damage occurs to a specific part, the split-type barrier allows for easier local replacement and repair without requiring replacement of the entire barrier, thereby reducing maintenance costs and downtime.

In an embodiment, the battery cell end face 231 includes a first battery cell end face 2311 and a second battery cell end face 2312, and the battery cell assembly end face includes at least two battery cell end faces 231 corresponding to at least two at least two unit battery cells, where a thickness J of a part of the barrier 5 corresponding to the battery cell end face 231 is 0.8 mm to 3 mm. When the thickness J of the part of the barrier is within a range of 0.8 mm to 3 mm, sufficient space can be provided for pressure relief while maintaining structural strength. This thickness design effectively guides and releases pressure under extreme conditions (such as thermal runaway) while maintaining a sufficient thermal isolation capability to slow thermal conduction between adjacent battery cells, thereby enhancing battery system safety; in addition, it can ensure the barrier provides structural support and isolation without adding excessive weight or occupying excessive space, preserving the overall lightweight and compactness of the tool battery pack.

In an embodiment, the battery cell end face 231 includes a first battery cell end face 2311 and a second battery cell end face 2312, and the battery cell assembly end face includes at least two battery cell end faces 231 corresponding to at least two unit battery cells, where a thickness J of a part of the barrier 5 corresponding to the battery cell end face 231 is 0.8 mm to 3 mm, and a difference between a thickness of a part of the barrier 5 corresponding to the first battery cell end face 2311 and a thickness of a part of the barrier 5 corresponding to the second battery cell end face 2312 is less than or equal to 1 mm. Since the thicker barrier 5 in high-frequency thermal runaway areas contains more materials and has a higher local heat capacity, it can absorb greater thermal energy and delay temperature rise rates, and its thermal conduction pathway can rapidly direct heat to the heat dissipation structure of the housing assembly 1, preventing heat accumulation; conversely, the thinner barrier 5 in low-frequency thermal runaway areas prioritizes heat dissipation efficiency, preventing abnormal local temperature spikes through rapid thermal conduction, thereby achieving differentiated pressure relief space responses.

In an embodiment, the battery cell end face 231 includes a first battery cell end face 2311 and a second battery cell end face 2312, and the battery cell assembly end face includes at least two battery cell end faces corresponding to at least two unit battery cells, where a thickness J of a part of the barrier 5 corresponding to the battery cell end face 231 is 0.8 mm to 3 mm, and a thickness of a part of the barrier 5 corresponding to the first battery cell end face 2311 is greater than that corresponding to the second battery cell end face 2312. The first battery cell end face 2311 is a high-frequency thermal runaway area that ejects high-temperature and high-pressure gases, where the barrier 5 is relatively thicker, creating a smaller pressure relief space to provide greater resistance to the initial high-pressure gas eruption during thermal runaway, thereby slowing down gas velocity and reducing direct impact on the pressure relief outlet; conversely, the second battery cell end face 2312 is a low-frequency thermal runaway area that also ejects high-temperature and high-pressure gases, where the barrier 5 is relatively thinner, forming a larger pressure relief space to contain more gas expansion and buffer pressure fluctuations, thereby achieving differentiated pressure relief space responses.

In an embodiment, the battery cell end face 231 includes a first battery cell end face 2311 and a second battery cell end face 2312, and the battery cell assembly end face includes at least two battery cell end faces 231 corresponding to at least unit battery cells, where a thickness J of a part of the barrier 5 corresponding to the battery cell end face 231 is 0.8 mm to 3 mm, and a thickness of a part of the barrier corresponding to the first battery cell end face is the same as that corresponding to the second battery cell end face. By controlling the same thickness, it simplifies processing.

In an embodiment, a battery cell assembly end face adjacent to the barrier 5 is configured as a reference plane, the barrier 5 includes a first end face 51 closer to the reference plane and a second end face 52 away from the reference plane, and a part of the first end face 51 corresponding to the battery cell end face 231 is provided with a convex structure away from the reference plane, where a maximum outline of the convex structure is greater than or equal to the battery cell end face 231. The adoption of the convex structure can increase the distance between the battery cell assembly end face and the end face of the barrier 5, thereby expanding the width of the pressure relief space. As a result, the expanded pressure relief space can more effectively contain and mitigate gases or heat released by the battery cell during abnormal conditions, preventing safety hazards caused by excessive pressure buildup. Additionally, the convex structure provides greater surface area, which facilitates more efficient heat dissipation through natural convection. The battery cell will generate heat during charging/discharging; therefore, a well-designed heat dissipation structure can keep the battery cell within a safe operating temperature range and improve thermal management efficiency.

In an embodiment, a battery cell assembly end face adjacent to the barrier 5 is configured as a reference plane, the barrier 5 includes a first end face 51 closer to the reference plane and a second end face 52 away from the reference plane, and a part of the first end face 51 corresponding to the battery cell end face 231 is provided with a convex structure away from the reference plane, where a maximum outline of the convex structure is smaller than the battery cell end face 231. The adoption of the convex structure can increase the distance between the battery cell assembly end face and the end face of the barrier 5, thereby expanding the width of the pressure relief space. As a result, the expanded pressure relief space can more effectively contain and mitigate gases or heat released by the battery cell during abnormal conditions, preventing safety hazards caused by excessive pressure buildup. Additionally, the convex structure provides greater surface area, which facilitates more efficient heat dissipation through natural convection. The battery cell will generate heat during charging/discharging; therefore, a well-designed heat dissipation structure can keep the battery cell within a safe operating temperature range and improve thermal management efficiency.

In an embodiment, a battery cell assembly end face adjacent to the barrier 5 is configured as a reference plane, the barrier 5 includes a first end face 51 closer to the reference plane and a second end face 52 away from the reference plane, and a part of the first end face 51 corresponding to the battery cell end face 231 is provided with a convex structure away from the reference plane. The adoption of the convex structure can increase the distance between the battery cell assembly end face and the end face of the barrier 5, thereby expanding the width of the pressure relief space. As a result, the expanded pressure relief space can more effectively contain and mitigate gases or heat released by the battery cell during abnormal conditions, preventing safety hazards caused by excessive pressure buildup. Additionally, the convex structure provides greater surface area, which facilitates more efficient heat dissipation through natural convection. The battery cell will generate heat during charging/discharging; therefore, a well-designed heat dissipation structure can keep the battery cell within a safe operating temperature range and improve thermal management efficiency.

In an embodiment, a battery cell assembly end face adjacent to the barrier 5 is configured as a reference plane, the barrier 5 includes a first end face 51 closer to the reference plane and a second end face 52 away from the reference plane, and parts of the first and second end faces 51, 52 corresponding to the battery cell end face 231 are provided with a convex structure away from the reference plane. The adoption of the convex structure can increase the distance between the battery cell assembly end face and the end face of the barrier 5, thereby expanding the width of the pressure relief space. As a result, the expanded pressure relief space can more effectively contain and mitigate gases or heat released by the battery cell during abnormal conditions, preventing safety hazards caused by excessive pressure buildup. Additionally, the convex structure provides greater surface area, which facilitates more efficient heat dissipation through natural convection. The battery cell will generate heat during charging/discharging; therefore, a well-designed heat dissipation structure can keep the battery cell within a safe operating temperature range and improve thermal management efficiency.

In an embodiment, a battery cell assembly end face adjacent to the barrier 5 is configured as a reference plane, the barrier 5 includes a first end face 51 closer to the reference plane and a second end face 52 away from the reference plane, and parts of the first and second end faces 51, 52 are flat. In an embodiment, the barrier 5 is made of a thermally conductive material with an ignition point higher than or equal to 300° C. The thermally conductive material with an ignition point higher than or equal to 300° C. ensures structural integrity of the barrier in high-temperature environments or during thermal runaway of a unit battery cell, resisting combustion or decomposition to enhance battery system safety; in addition, by using the thermally conductive material, the barrier 5 can effectively conduct heat from the unit battery cell quickly, helping balance temperatures between battery cells and prevent local overheating. With its superior thermal conductivity properties, it prevents excessive temperature rise caused by heat accumulation within the battery, thereby reducing thermal runaway risks.

In an embodiment, the barrier 5 is made of a rigid material with an ignition point higher than or equal to 300° C. The rigid material with an ignition point higher than or equal to 300° C. ensures structural integrity of the barrier in high-temperature environments or during thermal runaway of a unit battery cell, resisting combustion or decomposition to enhance battery system safety; in addition, the rigid material provides superior thermal resistance, effectively blocking flame propagation and thermal conduction to adjacent battery cells, thereby reducing thermal runaway propagation risks. Under extreme conditions, the rigid material can serve as a fireproof barrier, protecting internal battery cells from external heat sources or thermal effects generated by other battery cells.

In an embodiment, the barrier 5 is made of a metal material, and the distance G1 is greater than or equal to 1 mm and less than 10 mm. The metal barrier forms a non-contact thermal conduction channel with the battery cell end face through the distance G1, enabling rapid lateral dissipation of local heat to a heat dissipation surface of the housing during thermal runaway.

In an embodiment, the pressure relief airflow from the pressure relief outlet is discharged through the second heat dissipation vent 14. During thermal runaway, high-temperature and/or high-pressure gases from the pressure relief outlet are directionally discharged through the second heat dissipation vent 14 (air outlet), creating a co-directional superposition effect between the pressure relief airflow and the heat dissipation airflow at the outlet, thereby accelerating the removal of hazardous gases from the battery pack's core area and preventing internal gas retention.

In an embodiment, the pressure relief airflow from the pressure relief outlet passes through the second heat dissipation vent 14 made of a plastic material.

In an embodiment, the pressure relief airflow from the pressure relief outlet passes through the second heat dissipation vent 14 made of a metal material. When high-temperature gases flow through the metal heat dissipation vent, heat is rapidly conducted through a metal surface to either the housing of the battery pack or the external environment, thereby reducing the temperature of discharged gases and mitigating thermal damage to surrounding components. Functioning as an auxiliary heat dissipation channel, the metal heat dissipation vent works in synergy with the barrier's thermal conduction pathway to accelerate overall heat dissipation inside the battery pack.

In an embodiment, the pressure relief airflow from the pressure relief outlet passes through the second heat dissipation vent 14 provided with a pressure relief valve. During normal operation, the vent functions as a conventional heat dissipation channel to help maintain a normal operating temperature. When excessive pressure occurs, the pressure relief valve is activated to direct and discharge the airflow through the vent, thereby achieving pressure relief.

In an embodiment, the barrier 5 is made of an aluminum-containing metal material. The high thermal conductivity of aluminum allows the barrier to quickly absorb local heat generated during thermal runaway of a unit battery cell and conduct the heat longitudinally (perpendicular to the battery cell stacking direction) to a heat dissipation area of the housing of the battery pack, preventing lateral heat diffusion between battery cells. Additionally, for the same volume, using the aluminum-containing material for the barrier reduces weight, making it suitable for high-power tool applications where the weight of the battery pack is increasing, thereby achieving breakthrough improvements in various aspects such as thermal management, lightweight design, and manufacturing costs.

An Embodiment of a Tool Battery Pack

The housing assembly 1 includes a first heat dissipation vent 11, a holder mounting base (not shown), an opening 13, and a second heat dissipation vent 14, and is configured to accommodate the battery cell assembly 2, the electrode holder 3, and the control device 4, where the opening 13 is arranged on the housing assembly 1 corresponding to the electrode holder 3 to allow an electrode to pass through and connect with the electrode holder 3, the second heat dissipation vent 14 is arranged on the side of the battery pack where the opening 13 is located, and the first heat dissipation vent 11 and the second heat dissipation vent 14 are oppositely arranged on two sides of the housing assembly 1, with the first heat dissipation vent 11 serving as an air inlet and the second heat dissipation vent 14 as an air outlet, which creates a linear airflow channel between the first heat dissipation vent 11 and the second heat dissipation vent 14, thereby enabling more efficient airflow through the battery pack, ensuring that the internal temperature of the battery pack remains within a safe range, significantly improving heat dissipation efficiency, and reducing the risk of explosion due to battery cell overheating; the holder mounting base (not shown) is arranged on at least one interior side of the housing assembly 1 to secure the battery cell assembly 2, thereby preventing the battery cell holder 24 from displacement within the housing assembly 1; and a total area of the first heat dissipation vent 11 exceeds that of the second heat dissipation vent 14 and airflow enters the housing assembly 1 through the first heat dissipation vent 11 and exits through the second heat dissipation vent 14, thereby facilitating intake of more cooling air through the larger first heat dissipation vent 11 and ensuring sufficient contact between the cooling air and the battery cell assembly 2.

In an embodiment, the housing assembly 1 further includes a third heat dissipation vent 15 positioned on any side of the housing assembly 1 other than those provided with the first heat dissipation vent 11 and the second heat dissipation vent 14, allowing airflow on the side to enter the battery pack, and the airflow through the third heat dissipation vent 15 converges with that through the first heat dissipation vent 11 to form a combined airflow that is discharged through the second heat dissipation vent 14. By providing the third heat dissipation vent 15, it enables multi-directional airflow intake into the battery pack, promotes more uniform heat distribution across the battery cell assembly 2, and prevents local overheating. The convergence of internal airflow ensures comprehensive and efficient airflow distribution across the surface of the battery cell, maintaining overall thermal equilibrium while further enhancing the battery pack's heat dissipation capability. This design not only enhances air circulation and improves internal heat exchange efficiency but also ensures reliable heat dissipation. Even if one heat dissipation vent is partially blocked by external factors, the battery pack can still achieve sufficient heat dissipation through another inlet. Such a multi-inlet/single-outlet airflow configuration facilitates faster surface temperature reduction of the battery cell.

In an embodiment, the housing assembly 1 further includes third heat dissipation vents 15 positioned on any two opposite sides of the housing assembly 1 other than those provided with the first heat dissipation vent 11 and the second heat dissipation vent 14, allowing airflow on the opposite sides to enter the battery pack, and the airflow through the third heat dissipation vents 15 converges with that through the first heat dissipation vent 11 to form a combined airflow that is discharged through the second heat dissipation vent 14. By providing the third heat dissipation vents 15, it enables multi-directional airflow intake into the battery pack, promotes more uniform heat distribution across the battery cell assembly 2, and prevents local overheating. The convergence of internal airflow ensures comprehensive and efficient airflow distribution across the surface of the battery cell, maintaining overall thermal equilibrium while further enhancing the battery pack's heat dissipation capability. This design not only enhances air circulation and improves internal heat exchange efficiency but also ensures reliable heat dissipation. Even if one heat dissipation vent is partially blocked by external factors, the battery pack can still achieve sufficient heat dissipation through another inlet. Such a multi-inlet/single-outlet airflow configuration facilitates faster surface temperature reduction of the battery cell.

In an embodiment, a total area of the third heat dissipation vent 15 is less than or equal to that of the second heat dissipation vent 14, thereby solving the problem of local overheating caused by a single airflow direction. Sufficient air intake in the lateral direction or in other directions ensures uniform heat dissipation across all parts of the battery cell while preventing performance degradation or safety risks caused by local overheating. The meticulous vent configuration allows better control of temperature gradients across different areas of the device. The multi-inlet/single-outlet configuration ensures that even if one heat dissipation vent malfunctions due to partial blockage or other problems, sufficient airflow and heat dissipation effect can be provided by the remaining heat dissipation vents, thereby guaranteeing continuous operation and reliability of the system.

In an embodiment, a total area of the third heat dissipation vent 15 is greater than that of the second heat dissipation vent 14, thereby solving the problem of local overheating caused by a single airflow direction. Sufficient air intake in the lateral direction or in other directions ensures uniform heat dissipation across all parts of the battery cell while preventing performance degradation or safety risks caused by local overheating. The meticulous vent configuration allows better control of temperature gradients across different areas of the device. The multi-inlet/single-outlet configuration ensures that even if one heat dissipation vent malfunctions due to partial blockage or other problems, sufficient airflow and heat dissipation effect can be provided by the remaining heat dissipation vents, thereby guaranteeing continuous operation and reliability of the system.

In an embodiment, the second heat dissipation vent 14 is arranged at a central area on the side of the housing assembly 1 that is provided with the opening 13 and opposite to the first heat dissipation vent 11, enabling more uniform airflow distribution across the surface of the battery cell assembly 2. The resulting center-to-periphery airflow pattern mitigates local overheating while maintaining temperature uniformity inside the battery pack.

In an embodiment, the second heat dissipation vent 14 is arranged at a central area on the side of the housing assembly 1 that is provided with the opening 13 and opposite to the first heat dissipation vent 11, and is adjacent to the opening 13, enabling more uniform airflow distribution across the surface of the battery cell assembly 2. The resulting center-to-periphery airflow pattern mitigates local overheating while maintaining temperature uniformity inside the battery pack.

In an embodiment, the housing assembly 1 is provided with a locking slot 16 for locking the tool battery pack to prevent it from displacement. The second heat dissipation vent 14 is arranged at a central area on the side of the housing assembly 1 that is provided with the opening 13 and opposite to the first heat dissipation vent 11, and is located between the opening 13 and the locking slot 16, enabling more uniform airflow distribution across the surface of the battery cell assembly 2. The resulting center-to-periphery airflow pattern mitigates local overheating while maintaining temperature uniformity inside the battery pack.

In an embodiment, the housing assembly 1 has a 2-part split configuration and is designed as a recessed housing with an opening on the top or any side, where an end cover is connected to the housing via the side where the opening is located; or the housing assembly 1 has a 3-part split configuration and is designed as a through-type integrally molded housing with openings on opposite sides, where an end cover is connected to the housing via the openings; or the housing assembly 1 has a 4-part split configuration and is designed as a through-type split housing with openings on opposite sides, where the housing allows for top-bottom closing and an end cover is connected to the housing via the openings. The assembly form of the housing assembly 1 is not specifically limited herein.

In an embodiment, the housing assembly 1 further includes a drainage port 113 positioned on at least one side of the battery pack other than the side where the opening 13 is located, and the drainage port 113 is configured to drain water entering the housing assembly 1.

The battery cell assembly 2 includes a unit battery cell 23, a battery cell holder 24, a waterproof layer 25, and a waterproof member 26.

The unit battery cell 23 is a cylindrical battery cell having a first battery cell end face 2311 and a second battery cell end face 2312.

Referring to FIG. 5, in an embodiment, the first battery cell end face 2311 has a positive end face 23111, and the positive end face 23111 is a flat end face.

In an embodiment, the first battery cell end face 2311 has a positive end face 23111 provided with a cap end face 231111, where the cap end face 231111 protrudes outward from the positive end face 23111.

Referring to FIGS. 5 and 9, in an embodiment, the first battery cell end face 2311 has a positive end face 23111 and a negative end face 2312, where an isolating member 2313 is arranged between the negative end face 2312 and the positive end face 23111 to isolate a positive electrode from a negative electrode, thereby avoiding short circuits; and on the first battery cell end face 2311, a first edge, which is an edge of the negative end face 2312 closer to a central axis of the unit battery cell 23, is exposed from the exposed hole 242, and a projection distance c between the first edge and an inner edge of the exposed hole 242 is greater than or equal to 0.1 mm. By setting the distance between the exposed hole 242 and the first edge, it not only structurally enhances electrical isolation but also enables the waterproof layer 25 to cover the negative end face 2312 and the isolating member 2313. Once the isolating member 2313 becomes damaged or fails due to aging, the waterproof layer 25 serves as an additional barrier, preventing moisture ingress into the interior of the battery cell. Furthermore, by covering both the negative end face 2312 and the exposed hole 242, the waterproof layer 25 prevents moisture from penetrating through assembly gaps of the accommodating slot 241 into the battery cell end face along the length of the battery cell, thereby preventing any contact between the moisture and the positive and negative end faces 2111, 2312 to avoid potential short-circuit risks.

Referring to FIG. 4, the battery cell holder 24 is provided with an accommodating slot 241, an exposed hole 242, a first end 243, and a second end 244, where the accommodating slot 241 is arranged at the first end 243 of the battery cell holder 24 to accommodate the unit battery cell 23, a slot for accommodating the unit battery cell 23 is formed at an end of the accommodating slot 241, and the exposed hole 242 extending through the battery cell holder 24 is formed at another end of the accommodating slot 241; an inner area of the exposed hole 242 is less than a cross-sectional area of the accommodating slot 241 parallel to the exposed hole 242; an area of the exposed hole 242 is less than a maximum area of the first battery cell end face 2311 extending into the accommodating slot 241; a shape of the exposed hole 242 includes but is not limited to circular, oval, and square shapes; and the battery cell holder 24 is firmly fixed to the holder mounting base 12 in the housing assembly 1 by means of, but not limited to, welding or screw connection to provide additional structural support and anti-vibration protection.

Figure 17:
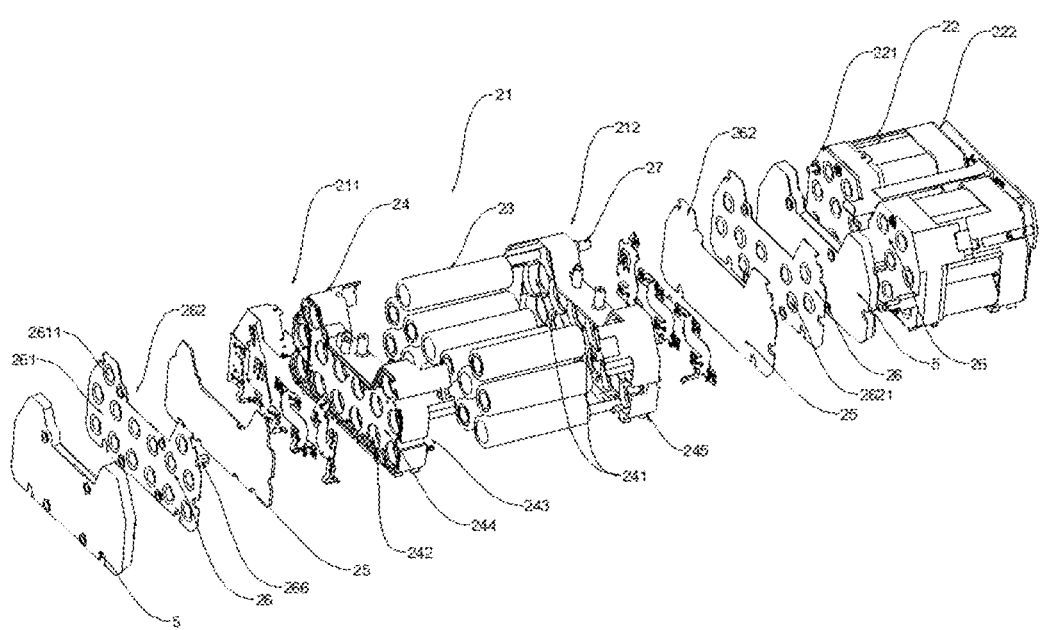
FIG. 17 is an exploded view showing an assembly relationship between a barrier, a waterproof member, a waterproof layer, a battery cell holder, and a unit battery cell of a tool battery pack provided in an embodiment of the present application.
Figure 18:
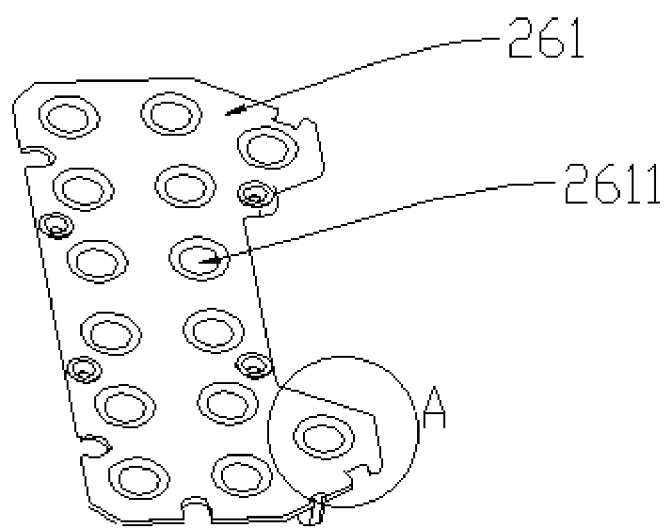
FIG. 18 is a schematic diagram of a waterproof member of a tool battery pack provided in an embodiment of the present application.

As shown in FIG. 17, in an embodiment, the battery cell holder 24 is provided with a limiting portion 245 configured to fit with the holder mounting base 12, and the limiting portion 245 includes a locking member 2451, which may take various forms, including but not limited to a screw hole tightened with a screw, a first mortise-tenon structure engaged with a second mortise-tenon structure on the housing assembly 1, welding the limiting portion 245 onto the housing assembly 1, or adhesive bonding, thereby preventing the battery cell holder 24 from displacement within the housing assembly 1.

In an embodiment, an inner height d of the exposed hole 242 is greater than or equal to 0.5 mm and less than or equal to 2.5 mm. By setting the inner height d of the exposed hole 242 to be greater than or equal to 0.5 mm, it provides effective support strength for the unit battery cell 23, thereby preventing positional displacement of the unit battery cell 23 caused by vibration or other external forces during normal use and enhancing the overall mechanical stability and safety of the battery pack. Additionally, keeping the height less than or equal to 2.5 mm helps reinforce the support strength while avoiding unnecessary material usage, thereby optimizing the weight of the battery pack and further improving energy efficiency and endurance. This height range also ensures efficient utilization of the internal space within the battery cell. While ensuring strong support, the well-designed inner height of the exposed hole avoids unnecessary occupation of the battery pack's effective space, allowing the battery pack to maximize capacity and energy density within a limited space.

The waterproof layer 25 is arranged at the second end 244 of the battery cell holder 24 through either a potting process or a vacuum deposition process, and covers the first and second battery cell end faces 2311, 2312 of the unit battery cell 23, thereby avoiding short-circuit risks caused by contact between the first and second battery cell end faces 2311, 2312 and external moisture.

Referring to FIGS. 17-24, the waterproof member 26 is arranged at the second end 246 of the battery cell holder 24 and has a first end face 261 away from the battery cell holder 24 and a second end face 262 closer to the battery cell holder 24, and at least part of the waterproof layer is arranged between the second end face 262 and the battery cell holder 24. By providing the waterproof member 26, subsequent assembly steps can proceed immediately after the waterproof layer 23 covers the battery cell holder 24, eliminating the need to wait for the waterproof layer to dry, which significantly enhances production line efficiency, reduces waiting time, and improves production flexibility and responsiveness.

Figure 19:
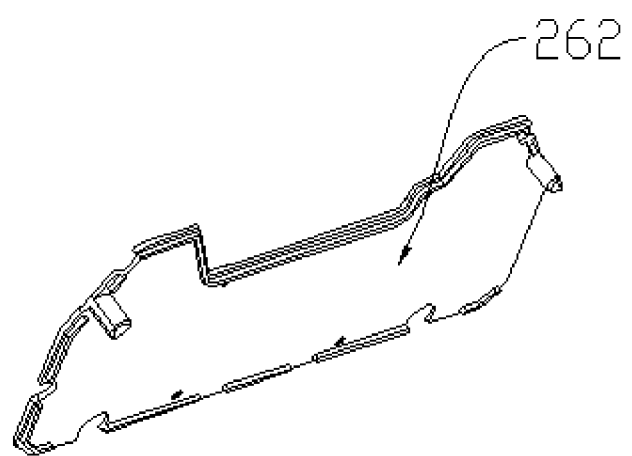
FIG. 19 is a schematic diagram of a waterproof member of a tool battery pack provided in an embodiment of the present application.

Referring to FIGS. 17 and 19, in an embodiment, the first end face 261 has a first convex face 2611 protruding toward the end face of the unit battery cell 23 at the exposed hole 242, the second end face 262 is flat, and the waterproof member 26 has the first convex face 2611 at the exposed hole 242. By configuring the waterproof member 26 to be thin at the exposed hole 242, during abnormal overheating conditions, the battery cell typically exhibits high-pressure and high-temperature jet fires at the first end face 2311. In such cases, an abnormal unit battery cell 23 can rapidly break the thin area of the waterproof layer, thereby providing a safe pressure relief mechanism that prevents impact on adjacent unit battery cells 23 or battery cell assemblies 2 and avoids cascading thermal runaway events.

As shown in FIGS. 17 and 19, in an embodiment, the first end face 261 has a first convex face 2611 protruding toward the end face of the unit battery cell 23 at the exposed hole 242, the second end face 262 is flat, and a distance b between the first convex face 2611 and the second end face 262 is greater than 0.3 mm and less than or equal to 3 mm. By setting a range of the distance b between the first convex face 2611 and the second end face 262, the thickness of the thin area can be optimally controlled for more reliable breakage while effectively preventing piercing of the waterproof layer due to improper operations during a compression process. This design ensures waterproof protection while providing a well-defined and controlled pressure relief channel for abnormal conditions such as high pressure and high temperature. Furthermore, by defining the range of the distance b, the thickness of the thin area can remain controllable and consistent during manufacturing, which not only ensures quality control in mass production but also enhances process stability.

Figure 20:
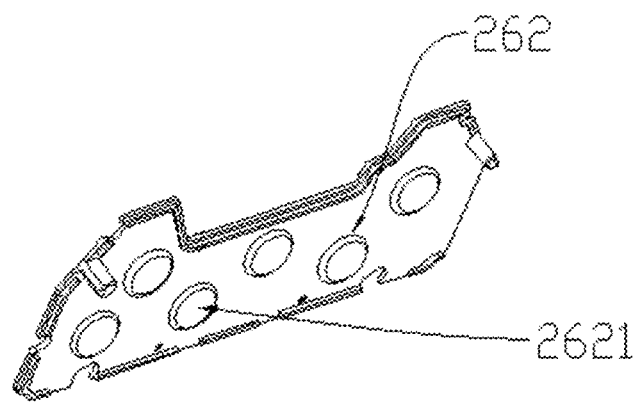
FIG. 20 is a schematic diagram of a waterproof member of a tool battery pack provided in an embodiment of the present application.
Figure 21:
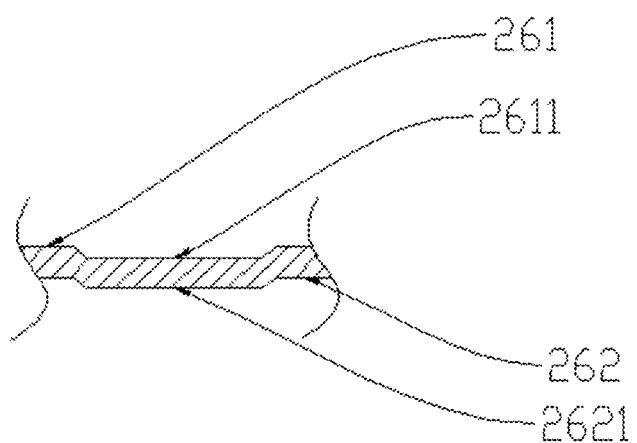
FIG. 21 is a sectional view of an enlarged area A of a waterproof member of a tool battery pack provided in an embodiment of the present application.
Figure 22:
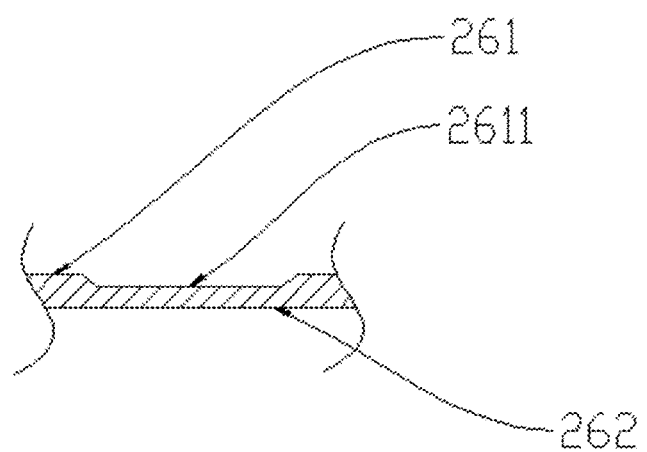
FIG. 22 is a sectional view of an enlarged area A of a waterproof member of a tool battery pack provided in an embodiment of the present application.
Figure 23:
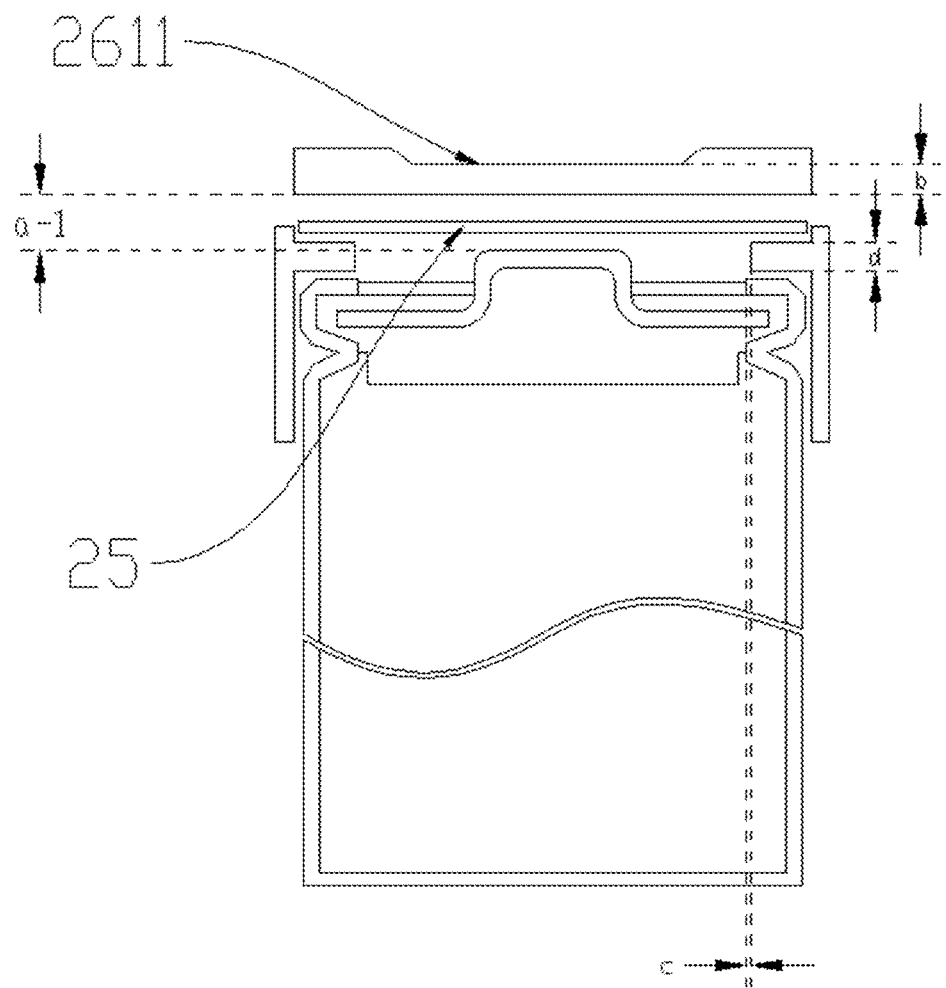
FIG. 23 is a schematic diagram showing an assembly relationship between a waterproof member, a waterproof layer, a battery cell holder, and a unit battery cell of a tool battery pack provided in an embodiment of the present application.
Figure 24:
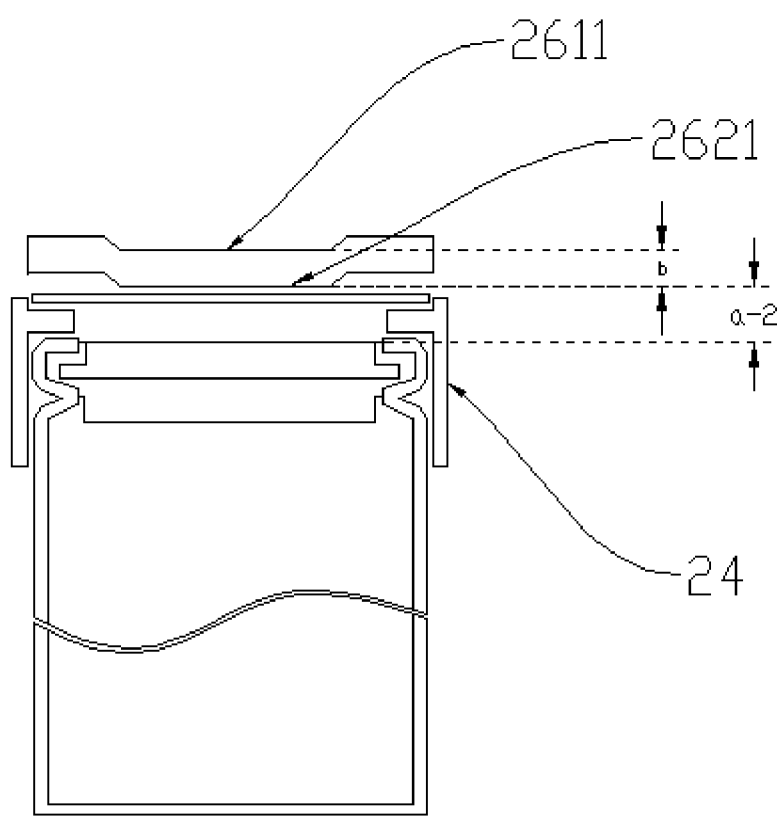
FIG. 24 is a schematic diagram showing an assembly relationship between a waterproof member, a waterproof layer, a battery cell holder, and a unit battery cell of a tool battery pack provided in an embodiment of the present application.

As shown in FIG. 20, in an embodiment, the second end face 262 is non-flat and has a second convex face 2621 protruding toward the end face of the unit battery cell 23 at the exposed hole 242, a distance a-2 between the second convex face 2621 and the positive end face 23111 is greater than or equal to 0.1 mm, or a distance a-1 between the second convex face 2621 and the cap end face 231111 is greater than or equal to 0.1 mm. By defining ranges of the distances a-1 and a-2, the thickness of the thin area of the waterproof layer can be optimally controlled to maintain effective waterproof protection while providing a well-defined and controlled pressure relief channel for abnormal conditions such as high pressure and high temperature. Furthermore, by defining ranges of the distances a-1 and a-2, the thickness of the thin area can remain controllable and consistent during manufacturing, which not only ensures quality control in mass production but also enhances process stability.

As shown in FIG. 20, in an embodiment, the second end face 262 is non-flat and has a second convex face 2621 protruding toward the end face of the unit battery cell 23 at the exposed hole 242, a distance a-2 between the second convex face 2621 and the positive end face 23111 is greater than or equal to 0.1 mm and less than 2 mm, or a distance a-1 between the second convex face 2621 and the cap end face 231111 is greater than or equal to 0.1 mm and less than 2 mm. By defining ranges of the distances a-1 and a-2, the thickness of the thin area of the waterproof layer can be optimally controlled to maintain effective waterproof protection while providing a well-defined and controlled pressure relief channel for abnormal conditions such as high pressure and high temperature. Furthermore, by defining ranges of the distances a-1 and a-2, the thickness of the thin area can remain controllable and consistent during manufacturing, which not only ensures quality control in mass production but also enhances process stability.

As shown in FIGS. 17-20, in an embodiment, the second end face 262 has a second convex face 2621 protruding toward the end face of the unit battery cell 23 at the exposed hole 242, a distance a-2 between the second convex face 2621 and the positive end face 23111 is greater than or equal to 0.5 mm and less than 1 mm, or a distance a-1 between the second convex face 2621 and the cap end face 231111 is greater than or equal to 0.5 mm and less than 1.5 mm. By defining ranges of the distances a-1 and a-2, the thickness of the thin area of the waterproof layer can be optimally controlled to maintain effective waterproof protection while providing a well-defined and controlled pressure relief channel for abnormal conditions such as high pressure and high temperature. Furthermore, by defining ranges of the distances a-1 and a-2, the thickness of the thin area can remain controllable and consistent during manufacturing, which not only ensures quality control in mass production but also enhances process stability.

In an embodiment, the second end face 262 has a second convex face 2621 protruding toward the end face of the unit battery cell 21 at the exposed hole 242, a distance a-2 between the second convex face 2621 and the positive end face 23111 is greater than or equal to 0.3 mm and less than or equal to 0.8 mm, or a distance a-1 between the second convex face 2621 and the cap end face 231111 is greater than or equal to 0.3 mm and less than or equal to 1.2 mm. By defining ranges of the distances a-1 and a-2, the thickness of the thin area of the waterproof layer can be optimally controlled to maintain effective waterproof protection while providing a well-defined and controlled pressure relief channel for abnormal conditions such as high pressure and high temperature. Furthermore, by defining ranges of the distances a-1 and a-2, the thickness of the thin area can remain controllable and consistent during manufacturing, which not only ensures quality control in mass production but also enhances process stability.

As shown in FIGS. 12-13, in an embodiment, the waterproof member 26 is made of a non-metal material with a thermal softening temperature higher than or equal to 90° C. As shown in FIG. 17, during 30A discharging of a 60V unit battery cell 23, the temperature rise of the battery cell end face reaches about 60° C. As current intensity increases, the temperature rise of the battery cell end face also escalates. When the battery cell is overheated during charging/discharging, a high-pressure and high-temperature jet fire is usually generated at the first battery cell end face 2311, at which time the temperature of the battery cell end face generally exceeds 100° C. By configuring the waterproof member 26 to be made of a non-metal material with a thermal softening temperature higher than or equal to 90° C., it can autonomously soften during an abnormal temperature rise of the unit battery cell 23, enabling the abnormal unit battery cell 23 to rapidly break the thin area of the waterproof layer, thereby providing a safe pressure relief mechanism that prevents impact on adjacent unit battery cells 23 or battery cell assemblies 2 and avoids cascading thermal runaway events; meanwhile, during a normal temperature rise of the unit battery cell 23, it provides stable and effective waterproof performance unaffected by the temperature rise.

In an embodiment, the waterproof member 26 is made of any one of acrylonitrile butadiene styrene (ABS), polycarbonate (PC), polypropylene (PP), polyethylene (PE), polyamide (PA), or glass fiber (GF). By configuring the waterproof member 26 to be made of any one of ABS, PC, PP, PE, PA, or GF, it can autonomously soften during an abnormal temperature rise of a unit battery cell 23, enabling the abnormal unit battery cell 23 to rapidly break the thin area of the waterproof layer, thereby providing a safe pressure relief mechanism that prevents impact on adjacent unit battery cells 23 or battery cell assemblies 2 and avoids cascading thermal runaway events; meanwhile, during a normal temperature rise of the unit battery cell 23, it provides stable and effective waterproof performance unaffected by the temperature rise.

In an embodiment, the waterproof member 26 is a waterproof plate with the same thickness, which is greater than or equal to 0.3 mm and less than or equal to 3 mm, and the waterproof member 26 has a first convex face 2611 and a second convex face 2621 protruding toward the end face of the unit battery cell 23 at the exposed hole 242. By configuring the first convex face 2611 and the second convex face 2421 to be thin at the exposed hole 242, during abnormal overheating conditions, the battery cell typically exhibits high-pressure and high-temperature jet fires at the first end face 2311. In such cases, an abnormal unit battery cell 23 can rapidly break the thin area of the waterproof plate, thereby providing a safe pressure relief mechanism that prevents impact on adjacent unit battery cells 23 or battery cell assemblies 2 and avoids cascading thermal runaway events.

In an embodiment, the waterproof member 26 is a waterproof plate with uneven thickness, and the thickness of a part of the waterproof member 26 at the exposed hole 242 is less than or equal to that of a part of the waterproof member 26 outside the exposed hole 242. By configuring the waterproof member 26 to be thin at the exposed hole 242, during abnormal overheating conditions, the battery cell typically exhibits high-pressure and high-temperature jet fires at the first battery cell end face 2311. In such cases, an abnormal unit battery cell 23 can rapidly break the thin area of the waterproof layer, thereby providing a safe pressure relief mechanism that prevents impact on adjacent unit battery cells 23 or battery cell assemblies 2 and avoids cascading thermal runaway events.

In an embodiment, the waterproof member 26 has a positioning member 266, and the positioning member 266 is a positioning hole configured to fit with a positioning post arranged on the battery cell holder 24, where the positioning post has a size ranging from 1 mm to 10 mm, thereby enabling effective positioning.

In an embodiment, the waterproof member 26 has a positioning member 266, and the positioning member 266 is a positioning post with a size ranging from 0.5 mm to 2 mm and configured to fit with a positioning hole formed in the battery cell holder 24, where part or all of the positioning post is accommodated in the positioning hole.

In an embodiment, the waterproof member 26 is connected to the battery cell holder 24 through, but not limited to, a mortise-and-tenon engagement structure, welding, adhesive bonding, or similar methods, ensuring a secured fit.

Figure 25:
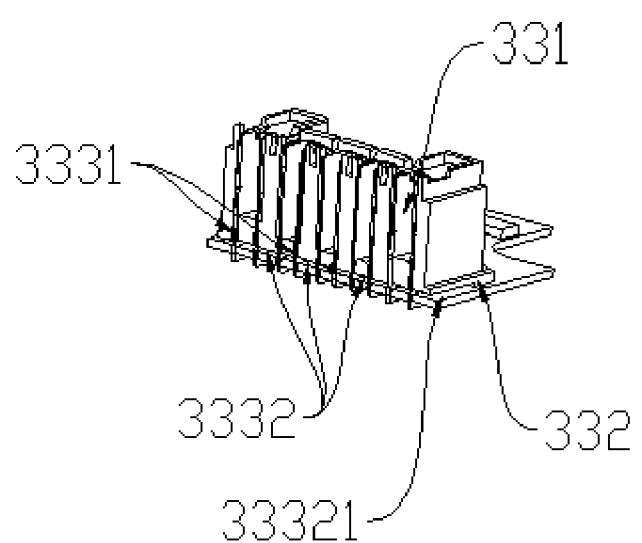
FIG. 25 is a schematic diagram of an electrode holder of a tool battery pack provided in an embodiment of the present application.
Figure 26:
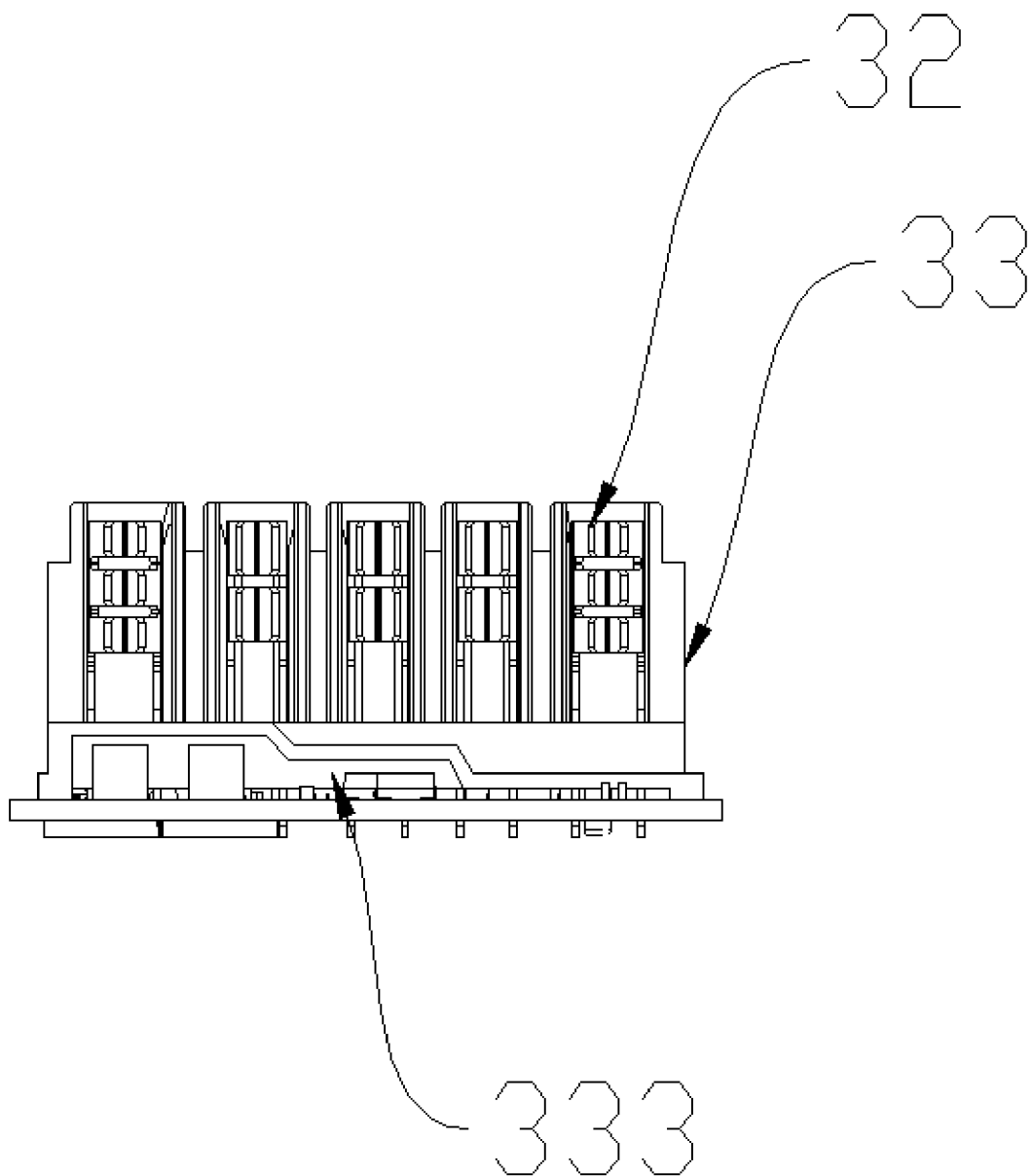
FIG. 26 is a schematic diagram of an electrode holder of a tool battery pack provided in an embodiment of the present application.
Figure 27:
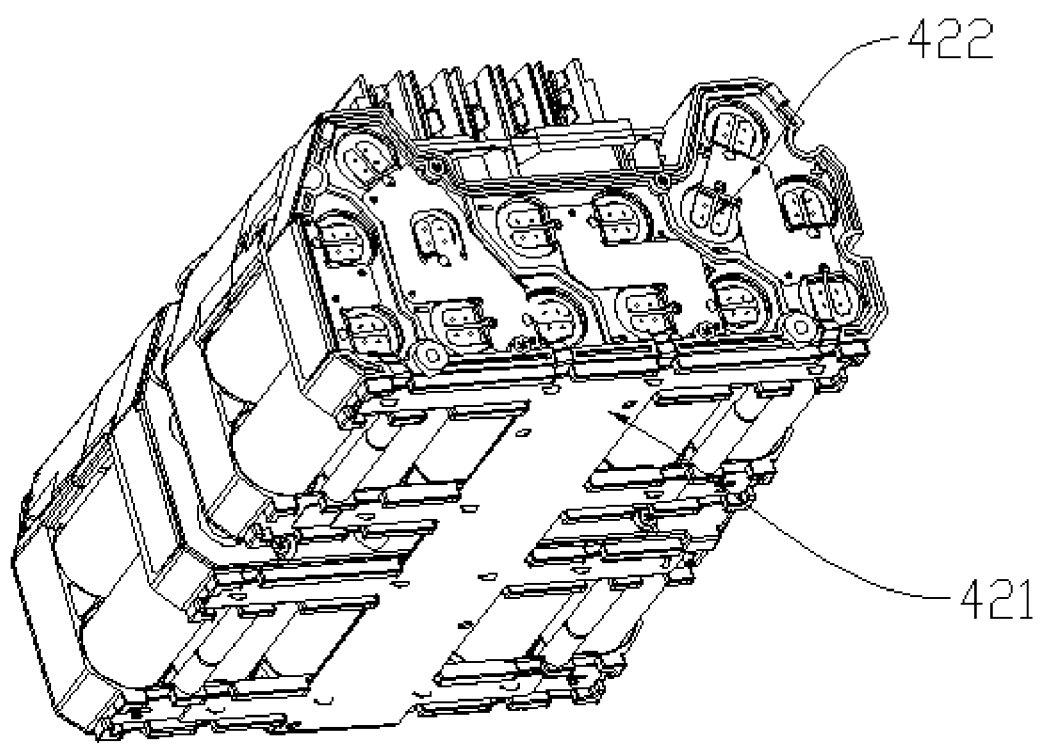
FIG. 27 is a schematic diagram of a tool battery pack provided in an embodiment of the present application.
Figure 28:
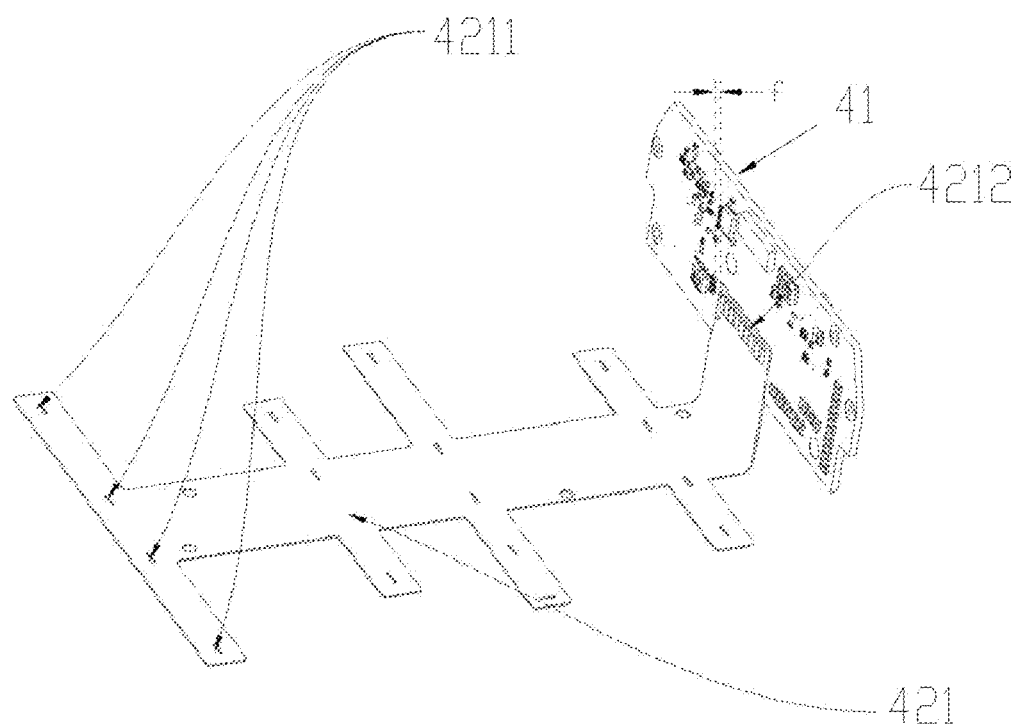
FIG. 28 is a perspective view of a connecting member provided in an embodiment of the present application.
Figure 29:
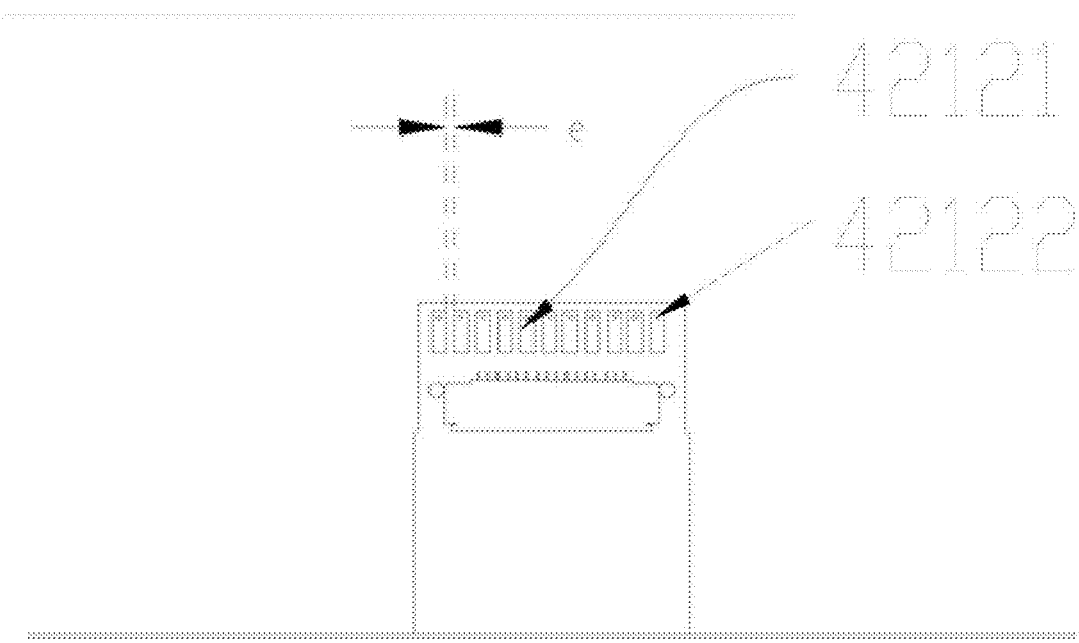
FIG. 29 is a schematic diagram of a control device of a tool battery pack provided in an embodiment of the present application.
Figure 30:
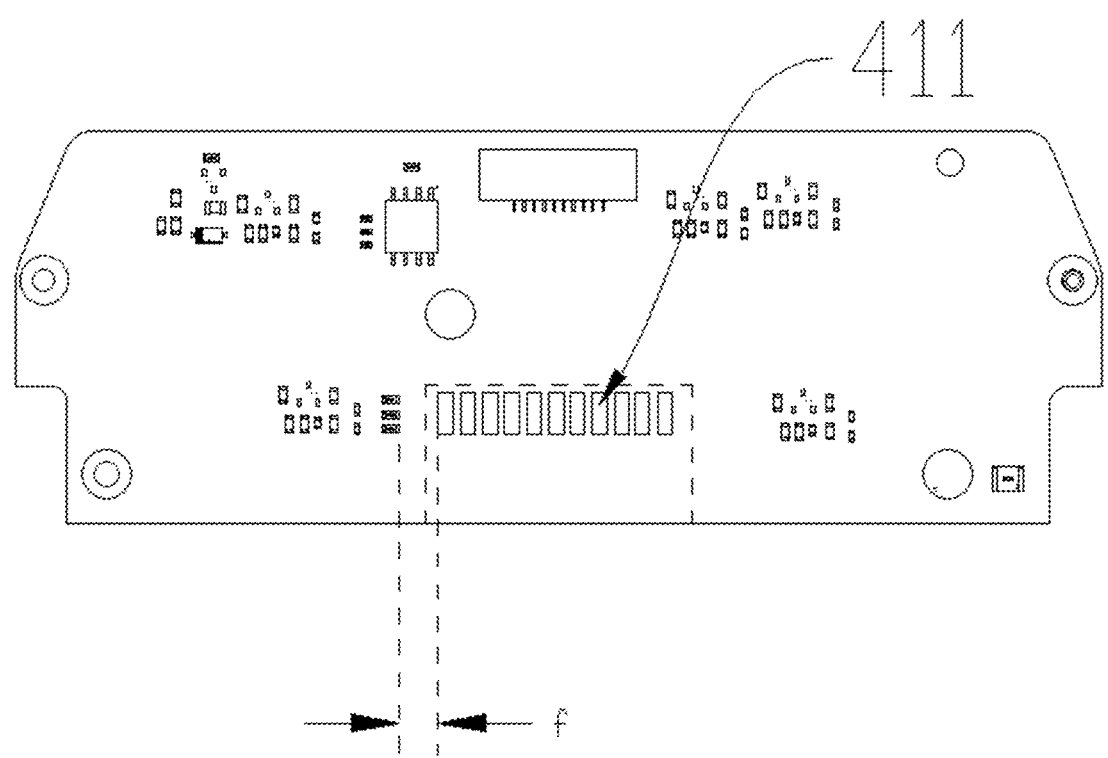
FIG. 30 is a schematic diagram of a control device of a tool battery pack provided in an embodiment of the present application.

Referring to FIGS. 25-26, the electrode holder 3 is provided with a terminal assembly 32 and a terminal mounting base 33 that includes a guide slot 331, a fixed end 332, and a waterproof space 333, where the guide slot 331 is configured to direct correct insertion of an electrode, preventing installation errors that could lead to short circuits, while also securing the electrode to ensure effective connection with the control device 4; the fixed end 332 is configured to be fixedly connected to the control device 4; and the waterproof space 333 includes a first waterproof space 3331 and a second waterproof space 3332, where the first waterproof space 3331 is an assembly gap between the terminal mounting base 33 and the terminal assembly 32 when the terminal mounting base 33 positions the terminal assembly 32, the second waterproof space 3332 is an assembly gap between the terminal mounting base 33 and the control device 4 and has at least one entry port 33321 located between the terminal mounting base 33 and the control device 4, and the entry port 33321 is designed to facilitate the rapid and uniform penetration of the waterproof material during operation to fill the second waterproof space 3332, thereby enabling efficient waterproofing during installation and maintenance and safeguarding long-term secure operation of the control device. The fully filled second waterproof space 3332 provides a fundamental waterproof barrier for the terminal assembly 32, protecting internal structures from moisture and contaminants that could otherwise lead to control board malfunctions.

In an embodiment, the fixed end 332 is a columnar structure with a height that is greater than or equal to 0.5 mm and less than or equal to 3 mm, and the fixed end 332 has a first end connected to the terminal mounting base 33 and a second end connected to the control device 4, supporting the terminal mounting base 33 to prevent it from contact with the control device 4; and the second waterproof space 3332 is a projected area of the terminal mounting base 33 on the control device 4, forming a non-contact space between the terminal mounting base 33 and the control device 4.

In an embodiment, the terminal mounting base 33 is provided with a protruding fixed end 332 on the side adjacent to the control device 4, where the fixed end 332 is connected to the control device 4, supporting the terminal mounting base 33 to prevent it from contact with the control device 4; and the second waterproof space 3332 is a projected area of the terminal mounting base 33 on the control device 4, forming a non-contact space between the terminal mounting base 33 and the control device 4.

In an embodiment, the waterproof material in both the first waterproof space 3331 and the second waterproof space 3332 is encapsulated in a single molding process via vacuum deposition, where a height of the entry port 33321 is greater than or equal to 0.5 mm, and/or a minimum height of the second waterproof space 3332 is greater than or equal to 0.5 mm. The height being greater than or equal to 0.5 mm ensures that, during both the vacuum deposition process and the overall battery pack compression, the waterproof material can fully and uniformly fill the second waterproof space 3332, thereby preventing insufficient filling in central areas of the second waterproof space 3332 and avoiding uneven distribution of the waterproof material within the second waterproof space 3332.

In an embodiment, the waterproof material in both the first waterproof space 3331 and the second waterproof space 3332 is encapsulated in a single molding process via low-pressure injection molding, where a height of the entry port 33321 is greater than or equal to 0.8 mm, and/or a minimum height of the second waterproof space 3332 is greater than or equal to 0.8 mm. The height being greater than or equal to 0.8 mm ensures that, during both the low-pressure injection molding process and the overall battery pack compression, the waterproof material can fully and uniformly fill the second waterproof space 3332, thereby preventing insufficient filling in central areas of the second waterproof space 3332 and avoiding uneven distribution of the waterproof material within the second waterproof space 3332.

In an embodiment, the waterproof material in both the first waterproof space 3331 and the second waterproof space 3332 is encapsulated via potting, where a height of the entry port 33321 is greater than or equal to 0.5 mm, and/or a minimum height of the second waterproof space 3332 is greater than or equal to 0.5 mm. The height being greater than or equal to 0.5 mm ensures that, during both the potting process and the overall battery pack compression, the waterproof material can fully and uniformly fill the second waterproof space 3332, thereby preventing insufficient filling in central areas of the second waterproof space 3332 and avoiding uneven distribution of the waterproof material within the second waterproof space 3332.

The control device 4 is arranged on the battery cell holder 24 and includes a control board 41 and a connecting member 42, where the control board 41 at least includes a control module and a communication module, and is connected to the unit battery cell 21 via the connecting member 42 through the exposed hole 242 to enable communication and control functions; the control module is configured to regulate parameters such as voltage, current, and temperature within the battery pack to ensure safe and efficient system operation; and the communication module is configured to conduct data exchange with external devices to achieve monitoring of the battery pack's operating status.

Referring to FIGS. 27-30, the connecting member 42 includes a unit battery cell detector 421 and multiple connecting tabs 422, where the unit battery cell detector 421 has a first connecting end 4211 and a second connecting end 4212; the first connecting end 4211 is connected to the connecting tabs 422; each of the connecting tabs 422 is connected to the unit battery cell 21 through the exposed hole 242; and the second connecting end 4212 is connected to the control board 41 through a welding process, thereby preventing poor waterproof performance of terminals in the case of messy power wiring to the control board through the terminals and facilitating easier maintenance of the battery pack.

In an embodiment, the second connecting end 4212 includes multiple first bonding pads 42121 whose number is at least equal to that of the unit battery cells 21, and the control board 41 includes multiple second bonding pads 411 whose number is at least equal to that of the first bonding pads 42121, where an area of each of the first bonding pads 42121 is less than or equal to that of each of the second bonding pads 411, which ensures the smaller first bonding pad 42121 can be completely attached to the larger second bonding pad 411, effectively reducing potential short-circuit risks between adjacent bonding pads, thereby enhancing circuit safety and reliability, and providing good thermal conduction and electrical connection; meanwhile, the thermal expansion effect of the smaller bonding pad on the larger one helps mitigate mechanical stress caused by thermal expansion and contraction, consequently reducing solder joint fatigue and potential weld cracks, while increasing mechanical strength of the welds and improving connection stability and durability.

In an embodiment, the second connecting end 4212 includes multiple first bonding pads 42121 whose number is at least equal to that of the unit battery cells 21, and the control board 41 includes multiple second bonding pads 411 whose number is at least equal to that of the first bonding pads 42121, where each of the first bonding pads 42121 is provided with at least one through-hole 42122 extending through the first bonding pad 42121, with a ratio of a diameter of the through-hole 42122 to a width of the first bonding pad 42121 being less than or equal to 1:2, which enhances solder permeability during the welding process and improves both mechanical strength and robustness of electrical connections; and the through-hole enables superior solder filling, resulting in more robust connections with better electrical conductivity.

In an embodiment, the second connecting end 4212 includes multiple first bonding pads 42121 whose number is at least equal to that of the unit battery cells 21, and the control board 41 includes multiple second bonding pads 411 whose number is at least equal to that of the first bonding pads 42121, where a minimum distance e between each two adjacent ones of the first bonding pads 42121 and/or between each two adjacent ones of the second bonding pads 411 is greater than or equal to 0.2 mm and less than or equal to 2 mm, which effectively reduces short-circuit risks caused by solder bridging or conductive particle contamination while reducing welding defects from manufacturing variations; and the increased distance provides greater tolerance for welding and subsequent operations during manufacturing and handling, enhances overall circuit safety and reliability, prevents signal crosstalk, and improves signal integrity and transmission efficiency, thereby enabling effective heat dissipation for each bonding pad to avoid local overheating due to excessive heat concentration, while facilitating superior thermal diffusion and management.

In an embodiment, the second connecting end 4212 includes multiple first bonding pads 42121 whose number is at least equal to that of the unit battery cells 21, and the control board 41 includes multiple second bonding pads 411 whose number is at least equal to that of the first bonding pads 42121, where a distance f between a surrounding component and a first bonding pad, adjacent to the surrounding component, of the first bonding pads 42121 and/or between a surrounding component and a second bonding pad, adjacent to the surrounding component, of the second bonding pads 411 is greater than or equal to 1 mm and less than or equal to 25 mm. The increased distance being greater than or equal to 1 mm and less than or equal to 25 mm between the bonding pad and the surrounding component helps mitigate electromagnetic interference effects, and this physical isolation can reduce signal coupling on the circuit board, enhance signal integrity, and ensure more stable electrical performance; meanwhile, the greater distance between the surrounding component and the bonding pad reduces short-circuit risks from accidental contact or material bridging (such as solder overflow), providing additional safety margin during production and subsequent equipment operations. Furthermore, the increased distance improves the circuit board's heat dissipation capability, allowing more efficient thermal conduction from high-temperature areas and preventing local overheating and heat accumulation issues.

In an embodiment, a tin-plating thickness on the first bonding pads 42121 and/or the second bonding pads 411 ranges from 0.05 mm to 0.15 mm. By controlling the tin-plating thickness to 0.05 mm to 0.15 mm, it can reduce excessive solder flow during the welding process, thereby reducing solder bridging and short circuit risks while simultaneously enhancing electrical isolation in the soldered areas. As shown in FIGS. 15-17, in an embodiment, the barrier 5 is arranged between the third battery cell assembly end face 221 and the second battery cell assembly end face 212. The third battery cell assembly end face 221 is configured as a reference plane, and the barrier 5 has a first end face 51 closer to the reference plane and a second end face 52 away from the reference plane, where a distance G1 exists between the first end face 51 and the third battery cell assembly end face 221, forming a first pressure relief space 55A therebetween, while a distance G2 exists between the second end face 52 and the second battery cell assembly end face 212, forming a second pressure relief space 55B therebetween, and the first pressure relief space 55A and the second pressure relief space 55B include at least one pressure relief outlet 55. Existing tool battery packs in the conventional technology lack barriers, resulting in that end faces of unit battery cells undergoing thermal runaway eject high-temperature gases and flames toward the housing assembly 1 and/or the battery cell assembly 2 due to failure in thermal diffusion, subsequently causing damage or destruction; in contrast, in the present application, the barrier arranged between the third battery cell assembly end face 221 and the second battery cell assembly end face 212 introduces a relatively independent pressure relief space between adjacent battery cell assemblies, thereby creating a physical shield. Through a cooperative structure of the accommodating slot 241 and the exposed hole 242, each unit battery cell 23 forms an independent air chamber, which, combined with the compartmentalizing and isolating effect of the barrier 5, can confine the thermal runaway impact range of a unit battery cell within two adjacent unit battery cells. The pressure relief space formed between the barrier 5 and the battery cell assembly end face, combined with the pressure relief outlet, establishes a directional pressure relief mechanism, which can direct high-temperature gases and flames caused by thermal runaway toward a predefined safe area, effectively mitigating internal pressure buildup risks. As a result, the entire battery pack can significantly reduce fire or explosion risks during thermal runaway of a unit battery cell and improve overall reliability and safety.

As shown in FIG. 14, in an embodiment, the third battery cell assembly end face 221 includes a first battery cell end face 2311. In a case that the battery cell end face within the second battery cell assembly end face 212 opposite to the first battery cell end face 2311 within the third battery cell assembly end face 221 is the first battery cell end face 2311 (it can be understood that in a two-cell battery cell assembly, if one battery cell in two adjacent sets of battery cell assembly end faces is positive, the battery cell end face opposite thereto is also positive), a distance G1 between the second end face 52 and the positive end face 23111 or the cap end face 231111 or the negative end face 23112 within the third battery cell assembly end face 221 is greater than or equal to 1 mm and less than 10 mm; and a distance G2 between the first end face 51 and the positive end face 23111 or the cap end face 231111 or the negative end face 23112 within the second battery cell assembly end face 212 is greater than or equal to 1 mm and less than 10 mm. By setting the distances G1 and G2 to form interval spaces between the adjacent battery cell assemblies, an effective buffer area is created between oppositely arranged negative end faces. This design limits the heat dissipation capability of a unit battery cell undergoing thermal runaway within the entire tool battery pack, which is a critical factor in ensuring the safety of the tool battery pack. By precisely controlling the distances G1 and G2, it can effectively block initial thermal surges while directing them toward the designated pressure relief space. This design can effectively limit thermal propagation effects from the unit battery cell undergoing thermal runaway to adjacent unit battery cells in front, rear, left, and right directions, thereby delaying or preventing thermal runaway propagation from the unit battery cell throughout the entire tool battery pack to a certain extent; moreover, it maintains a compact size of the entire tool battery pack, ensuring compatibility with existing tools and devices without compromising safety or performance. The standardized distances also simplify and streamline production and assembly processes, enhancing operational efficiency.

In an embodiment, the distance G1 is equal to the distance G2. In this case, the symmetrical distances G1/G2 enable high-temperature gases to be discharged in parallel from both the first and second pressure relief spaces at identical flow rates during the early stage of thermal runaway, preventing local airflow vortices caused by uneven pressure relief and thereby reducing thermal surge superposition risks. The equidistant dual-pressure-relief-space design establishes a bidirectional pressure relief compensation mechanism: when abnormal gas generation occurs on one side of the battery cell assembly, the symmetrical channels automatically balance a pressure difference formed between both sides to prevent structural deformation from unilateral overpressure while suppressing thermal runaway chain reactions. The balanced pressure relief channels distribute heat uniformly along the battery pack's axial direction, and when combined with the barrier's high-temperature resistance, significantly mitigate inter-battery-cell thermal stress concentration issues.

In an embodiment, a difference ΔG between the distances G1 and G2 is less than or equal to 3 mm. The difference creates asymmetric thermal conduction pathways, enabling differentiated thermal propagation management within the spaces. By increasing the distances in high-risk areas such as positive battery cell end faces while decreasing the distances in low-risk areas such as negative battery cell end faces, the design achieves more flexible and efficient thermal management; moreover, through meticulous space management, the design enhances the tool battery pack's safety performance during thermal runaway while maintaining its structural compactness and applicability, thereby enhancing the practical effectiveness of the tool battery pack in real applications.

In an embodiment, the battery cell end face 231 includes a first battery cell end face 2311 and a second battery cell end face 2312, and the battery cell assembly end face includes at least two battery cell end faces 231 corresponding to at least two unit battery cells, where a thickness J of a part of the barrier 5 corresponding to the battery cell end face 231 is 0.8 mm to 3 mm. When the thickness J of the part of the barrier is within a range of 0.8 mm to 3 mm, sufficient space can be provided for pressure relief while maintaining structural strength. This thickness design effectively guides and releases pressure under extreme conditions (such as thermal runaway) while maintaining a sufficient thermal isolation capability to slow thermal conduction between adjacent battery cells, thereby enhancing battery system safety; in addition, it can ensure the barrier provides structural support and isolation without adding excessive weight or occupying excessive space, preserving the overall lightweight and compactness of the tool battery pack.

In an embodiment, the barrier 5 is made of a metal material, and the distance G1 is greater than or equal to 1 mm and less than 10 mm. The metal barrier forms a non-contact thermal conduction channel with the battery cell end face through the distance G1, enabling rapid lateral dissipation of local heat to a heat dissipation surface of the housing during thermal runaway.

In an embodiment, the pressure relief airflow from the pressure relief outlet is discharged through the second heat dissipation vent 14. During thermal runaway, high-temperature and/or high-pressure gases from the pressure relief outlet are directionally discharged through the second heat dissipation vent 14 (air outlet), creating a co-directional superposition effect between the pressure relief airflow and the heat dissipation airflow at the outlet, thereby accelerating the removal of hazardous gases from the battery pack's core area and preventing internal gas retention.

In an embodiment, the pressure relief airflow from the pressure relief outlet passes through the second heat dissipation vent 14 made of a plastic material.

In an embodiment, the pressure relief airflow from the pressure relief outlet passes through the second heat dissipation vent 14 made of a metal material. When high-temperature gases flow through the metal heat dissipation vent, heat is rapidly conducted through a metal surface to either the housing of the battery pack or the external environment, thereby reducing the temperature of discharged gases and mitigating thermal damage to surrounding components. Functioning as an auxiliary heat dissipation channel, the metal heat dissipation vent works in synergy with the barrier's thermal conduction pathway to accelerate overall heat dissipation inside the battery pack.

In an embodiment, the pressure relief airflow from the pressure relief outlet passes through the second heat dissipation vent 14 provided with a pressure relief valve. During normal operation, the vent functions as a conventional heat dissipation channel to help maintain a normal operating temperature. When excessive pressure occurs, the pressure relief valve is activated to direct and discharge the airflow through the vent, thereby achieving pressure relief.

In an embodiment, the barrier 5 is made of an aluminum-containing metal material. The high thermal conductivity of aluminum allows the barrier to quickly absorb local heat generated during thermal runaway of a unit battery cell and conduct the heat longitudinally (perpendicular to the battery cell stacking direction) to a heat dissipation area of the housing of the battery pack, preventing lateral heat diffusion between battery cells. Additionally, for the same volume, using the aluminum-containing material for the barrier reduces weight, making it suitable for high-power tool applications where the weight of the battery pack is increasing, thereby achieving breakthrough improvements in various aspects such as thermal management, lightweight design, and manufacturing costs.

In an embodiment, a tool battery pack further includes a thermally conductive barrier 5, where "thermally conductive" refers to the barrier's thermal conduction capability under steady-state thermal transfer conditions, technically characterized by a thermal conductivity greater than or equal to 5 W/(m·K). The barrier 5 is arranged at the battery cell assembly end face via a positioning connector 57. As shown in FIG. 4, the battery cell assembly end face is configured as a reference plane, and the barrier 5 includes a first end face 51 closer to the reference plane and a second end face 52 away from the reference plane, where a distance G1 exists between the first end face 51 and the battery cell assembly end face, forming a pressure relief space 53 therebetween, and the pressure relief space 53 includes at least one pressure relief outlet 55. Through a cooperative structure of the accommodating slot 241 and the exposed hole 242, each unit battery cell 23 forms an independent air chamber, which, combined with the compartmentalizing and isolating effect of the barrier 5, can confine the thermal runaway impact range of a unit battery cell within two adjacent unit battery cells. The pressure relief space formed between the barrier 5 and the battery cell assembly end face, combined with the pressure relief outlet, establishes a directional pressure relief mechanism, which can direct high-temperature gases and flames caused by thermal runaway toward a predefined safe area, effectively mitigating internal pressure buildup risks while providing a dual effect of protection and isolation. Moreover, the thermally conductive barrier 5 not only acts as a physical shield against direct flame impingement on the housing and/or adjacent battery cells but also rapidly dissipates local heat across the entire battery pack's heat dissipation system by virtue of its thermal conduction characteristics, enabling flame quenching in gaps due to metal surface cooling effects and containment of solid molten debris within the pressure relief space, thereby preventing ejection toward the adjacent battery cells. As a result, the entire battery pack can significantly reduce fire or explosion risks during thermal runaway of a unit battery cell and improve overall reliability and safety.

In an embodiment, the barrier 5 is made of a rigid material with an ignition point higher than or equal to 300° C. The rigid material with an ignition point higher than or equal to 300° C. ensures structural integrity of the barrier in high-temperature environments or during thermal runaway of a unit battery cell, resisting combustion or decomposition to enhance battery system safety; in addition, the rigid material provides superior thermal resistance, effectively blocking flame propagation and thermal conduction to adjacent battery cells, thereby reducing thermal runaway propagation risks. Under extreme conditions, the rigid material can serve as a fireproof barrier, protecting internal battery cells from external heat sources or thermal effects generated by other battery cells.

As shown in FIG. 4, in an embodiment, a distance G1 between the first end face 51 and the positive end face 23111 or the cap end face 231111 or the negative end face 23112 of the battery cell assembly end face is greater than or equal to 1 mm and less than 10 mm. By setting the distance G1 to form a pressure relief space, an effective buffer area is created between oppositely arranged battery cell end faces. This design limits the heat dissipation capability of a unit battery cell undergoing thermal runaway within the entire tool battery pack, which is a critical factor in ensuring the safety of the tool battery pack. By precisely controlling the distance G1, it can effectively block initial thermal surges while directing them toward the designated pressure relief space. This design can effectively limit thermal propagation effects from the unit battery cell undergoing thermal runaway to adjacent unit battery cells 23 and/or the housing assembly 1 in front, rear, left, and right directions, thereby delaying or preventing thermal runaway propagation from the unit battery cell throughout the entire tool battery pack to a certain extent; moreover, it maintains a compact size of the entire tool battery pack, ensuring compatibility with existing tools and devices without compromising safety or performance. The standardized distance also simplifies and streamlines production and assembly processes, enhancing operational efficiency.

Those skilled in the art will appreciate that the above embodiments are specific embodiments for implementing the present application, and in actual applications, various modifications may be made thereto in form and detail without departing from the spirit and scope of the present application.

What is claimed is:
1. A tool battery pack, comprising:
a housing assembly,
wherein the housing assembly is configured to accommodate a unit battery cell, and the unit battery cell comprises a battery cell end face and a battery cell body, wherein
the tool battery pack further comprises a thermally conductive barrier, wherein the barrier is arranged at the battery cell end face, the battery cell end face is configured as a reference plane, and the barrier has a first end face closer to the reference plane and a second end face away from the reference plane, wherein a distance G1 exists between the first end face and the battery cell end face, forming a pressure relief space therebetween, and the pressure relief space comprises at least one pressure relief outlet;

wherein the barrier is made of a metal material, and the distance G1 is greater than or equal to 1 mm and less than 10 mm.

2. The tool battery pack of claim 1, wherein
a thickness J of a part of the barrier corresponding to the battery cell end face is greater than or equal to 0.8 mm and less than or equal to 3 mm.

3. The tool battery pack of claim 2, wherein
the number of the unit battery cell is at least two, and the battery cell end face comprises a first battery cell end face and a second battery cell end face corresponding to the at least two unit battery cells, wherein a difference between a thickness of a part of the barrier corresponding to the first battery cell end face and a thickness of a part of the barrier corresponding to the second battery cell end face is less than or equal to 1 mm.

4. The tool battery pack of claim 3, wherein
the thickness of the part of the barrier corresponding to the first battery cell end face is greater than or equal to the thickness of the part of the barrier corresponding to the second battery cell end face.

5. The tool battery pack of claim 2, wherein
a part of the first end face of the barrier corresponding to the battery cell end face is provided with a convex structure away from the reference plane, and/or,
a part of the second end face of the barrier corresponding to the battery cell end face is provided with a convex structure away from the reference plane.

6. The tool battery pack of claim 1, wherein
parts of the first and second end faces of the barrier corresponding to the battery cell end face are flat.

7. A tool battery pack, comprising:
a housing assembly, and
a battery cell assembly,
wherein
the housing assembly is configured to accommodate the battery cell assembly, the battery cell assembly comprises a first battery cell assembly comprising a first battery cell assembly end face and a second battery cell assembly end face, a second battery cell assembly comprising a third battery cell assembly end face and a fourth battery cell assembly end face, and a battery cell assembly connecting member configured for connecting the first battery cell assembly to the second battery cell assembly, wherein the first battery cell assembly and the second battery cell assembly each is configured to accommodate a unit battery cell, and the third battery cell assembly end face and the second battery cell assembly end face are oppositely arranged; wherein
the tool battery pack further comprises a barrier, wherein the barrier is arranged between the third battery cell assembly end face and the second battery cell assembly end face via a positioning connector, the third battery cell assembly end face is configured as a reference plane, and the barrier has a first end face closer to the reference plane and a second end face away from the reference plane, wherein a distance G1 exists between the first end face and the third battery cell assembly end face, forming a first pressure relief space therebetween, while a distance G2 exists between the second end face and the second battery cell assembly end face, forming a second pressure relief space therebetween, wherein the first pressure relief space and the second pressure relief space comprise at least one pressure relief outlet;

wherein the barrier is made of a metal material, and the distance G1 is greater than or equal to 1 mm and less than 10 mm.

8. The tool battery pack of claim 7, wherein
the distance G2 is greater than or equal to 1 mm and less than 10 mm.

9. The tool battery pack of claim 7, wherein
a difference between the distances G1 and G2 is less than or equal to 3 mm.

10. The tool battery pack of claim 9, wherein
the distance G1 is equal to the distance G2.

11. The tool battery pack of claim 7, wherein
the unit battery cell comprises a battery cell end face and a battery cell body, and a thickness J of a part of the barrier corresponding to the battery cell end face is greater than or equal to 0.8 mm and less than or equal to 3 mm.

12. The tool battery pack of claim 11, wherein
the battery cell end face comprises a first battery cell end face and a second battery cell end face, and the battery cell assembly end face comprises at least two battery cell end faces corresponding to at least two unit battery cells, wherein a difference between a thickness of a part of the barrier corresponding to the first battery cell end face and a thickness of a part of the barrier corresponding to the second battery cell end face is less than or equal to 1 mm.

13. The tool battery pack of claim 12, wherein
the thickness of the part of the barrier corresponding to the first battery cell end face is equal to the thickness of the part of the barrier corresponding to the second battery cell end face; or
the thickness of the part of the barrier corresponding to the first battery cell end face is greater than the thickness of the part of the barrier corresponding to the second battery cell end face.

14. The tool battery pack of claim 11, wherein
a part of the first end face of the barrier corresponding to the battery cell end face is provided with a convex structure away from the reference plane, and/or
a part of the second end face of the barrier corresponding to the battery cell end face is provided with a convex structure away from the reference plane.

15. The tool battery pack of claim 11, wherein
parts of the first and second end faces of the barrier corresponding to the battery cell end face are flat.

16. A tool battery pack, comprising:
a unit battery cell comprising a battery cell end face and a battery cell body;
a housing assembly configured to accommodate the unit battery cell;
a battery cell holder arranged at the housing assembly, wherein the battery cell holder comprises a first end for supporting the unit battery cell and a second end opposite to the first end;
a thermally conductive barrier arranged at the battery cell end face, wherein the battery cell end face is configured as a reference plane, and the barrier has a first end face closer to the reference plane and a second end face away from the reference plane, wherein a distance G1 exists between the first end face and the battery cell end face, forming a pressure relief space therebetween, and the pressure relief space comprises at least one pressure relief outlet; the thermally conductive barrier is made of a metal material, and the distance G1 is greater than or equal to 1 mm and less than 10 mm; and a waterproof member received within the housing assembly and arranged between the second end of the battery cell holder and the thermally conductive barrier.

17. The tool battery pack of claim 16, wherein the waterproof member is made of a non-metal material with a thermal softening temperature lower than an ignition point of the thermally conductive barrier.

18. The tool battery pack of claim 17, wherein the thermal softening temperature is higher than or equal to 90° C.

19. The tool battery pack of claim 16, wherein the waterproof member is made of any one of acrylonitrile butadiene styrene, polycarbonate, polypropylene, polyethylene, polyamide, or glass fiber.

20. The tool battery pack of claim 16, wherein the waterproof member is a waterproof plate with the same thickness, which is greater than or equal to 0.3 mm and less than or equal to 3 mm.

\* \* \* \* \*